US012593117B2

(12) United States Patent
Hebda et al.

(10) Patent No.: US 12,593,117 B2
(45) Date of Patent: Mar. 31, 2026

(54) IMAGING SYSTEM LENS MOUNTING ARRANGEMENT

(71) Applicant: Aptiv Technologies AG, Schaffhausen (CH)

(72) Inventors: Pawel Hebda, Cracow (PL);
Przemyslaw Antos, Skawina (PL);
Arkadiusz Rafalowski, Brzezinka (PL);
Rafal G. Ochala, Jedlicze (PL)

(73) Assignee: Aptiv Technologies AG, Schaffhausen (CH)

( * ) Notice: Subject to any disclaimer, the term of this patent is extended or adjusted under 35 U.S.C. 154(b) by 313 days.

(21) Appl. No.: 18/355,204

(22) Filed: Jul. 19, 2023

(65) Prior Publication Data

US 2024/0027878 A1 Jan. 25, 2024

(30) Foreign Application Priority Data

Jul. 22, 2022 (GB) ...................................... 2210755
Jul. 5, 2023 (EP) ..................................... 23183744

(51) Int. Cl.
| | |
|---|---|
| *H04N 23/52* | (2023.01) |
| *G02B 7/02* | (2021.01) |
| *H01R 12/71* | (2011.01) |
| *H04N 23/55* | (2023.01) |

(52) U.S. Cl.
CPC ............. *H04N 23/52* (2023.01); *G02B 7/025* (2013.01); *H01R 12/718* (2013.01); *H04N 23/55* (2023.01)

(58) Field of Classification Search
CPC ...... G06K 7/10831; H05K 1/18; H01R 12/70; H01R 12/718; H04N 23/52; H04N 23/55; G02B 7/025

USPC .......................................................... 348/340
See application file for complete search history.

(56) References Cited

U.S. PATENT DOCUMENTS

| | | | |
|---|---|---|---|
| 7,422,382 | B2 | 9/2008 | Seo |
| 2019/0384055 | A1 | 12/2019 | Rafalowski et al. |
| 2022/0019130 | A1 | 1/2022 | Moehrle et al. |
| 2022/0159159 | A1 | 5/2022 | Byrne et al. |

FOREIGN PATENT DOCUMENTS

| | | | | |
|---|---|---|---|---|
| CN | 111815807 | 10/2020 | | |
| CN | 216905047 | 7/2022 | | |
| EP | 3226051 B1 | * 12/2020 | ............. | G02B 7/021 |
| JP | 2010278678 A | * 12/2010 | | |

(Continued)

OTHER PUBLICATIONS

FIT Database Translation of Primary Reference KR-20210046369-A (Year: 2025).*

(Continued)

*Primary Examiner* — Justin W Rider
(74) *Attorney, Agent, or Firm* — Harness, Dickey & Pierce, P.L.C.

(57) ABSTRACT

According to the specification there is provided an imaging system that includes: an imaging device mounted on a PCB of the imaging system; a lens; and a lens holder. The imaging system further includes an electrically conducting element configured to provide an electrical grounding connection between the lens and the PCB. According to further aspects, arrangements of a conducting element for providing an electrical grounding of lens of an imaging system are provided.

11 Claims, 15 Drawing Sheets

(56)         References Cited

FOREIGN PATENT DOCUMENTS

| | | |
|---|---|---|
| KR | 20210046369 | 4/2021 |
| KR | 20210046369 A * | 4/2021 ........... H05K 9/0067 |
| WO | 2008023894 | 2/2008 |
| WO | 2022028248 A1 | 2/2022 |

OTHER PUBLICATIONS

"Combined Search and Examination Report", GB Application No. 2210755.1, Jan. 20, 2023, 11 pages.
Extended European Search Report regarding European Patent Application No. 23183744.4, dated Nov. 10, 2023.

* cited by examiner

IMAGING SYSTEM LENS MOUNTING ARRANGEMENT

INCORPORATION BY REFERENCE

This application claims priority to European Patent Application No. EP23183744.4, filed Jul. 5, 2023, and claims priority to United Kingdom Patent Application No. GB2210755.1, filed Jul. 22, 2022, the disclosures of which are incorporated by reference in their entireties.

BACKGROUND

In one current approach a lens may be mounted to a lens holder using an adhesive such as an epoxy adhesive. In such arrangements there is typically no electrical connection between the lens and the lens holder and issues with electromagnetic compatibility, EMC, and electrostatic discharge, ESD, may affect the imaging system when the lens holder is connected to a camera mounted to a printed circuit board, PCB. To address this problem, in one approach, a unibody lens has been proposed to provide a lens mounted to the PCB. However, such unibody lens arrangements are expensive and of limited application due to the form and structure thereof. Other solutions have been proposed based on the use of multiple design iterations to arrive at a suitable arrangement with improved noise and EMC performance. Due to constantly growing requirements from the customer regarding the camera performance including relating to signal frequency, 5g technology with high frequency and also taking into account of the demands for reduction of the camera unit size, antenna effects became more and more noticeable. Accordingly, there is a need to address the above issues and problems with EMC and to provide an alternative and improved imaging system having an improved lens mounting arrangement that addresses the problems with previous set-ups.

SUMMARY

The specification and claims provide exemplary arrangements which address the problems noted above associated with the previous imaging systems.

According to a first aspect there is provided an imaging system (100) comprising: an imaging device (160) mounted on a PCB (180) of the imaging system; a lens (110); and a lens holder (130); wherein the imaging system further comprises: an electrically conducting element (200, 300, 400, 500, 600) configured to provide an electrical grounding connection between the lens and the PCB (180). Further, wherein the electrically conducting element (200, 300, 400, 500, 600) is resilient and comprises first and second engagement surfaces biased to engage with corresponding portions of a bearing surface of the lens (110) and a bearing surface of the lens holder (130) or the PCB (160).

The arrangements of the specification advantageously provide for an electrical grounding between the lens and the PCB of the imaging system and addresses problems associated with prior imaging systems relating to noise and EMC issues. The imaging system comprises an electrically conducting element configured to provide an electrically conducting contact between the lens and the lens holder or the PCB. The electrically conducting element is configured for coupling to the imaging system such that it does not affect the optical alignment of the system. It can be assembled with flexibility to the imaging system.

In one embodiment of the first aspect, the electrically conducting element (200, 300, 400, 500, 600) is configured in use for coupling directly to the lens (110) and to one of the lens holder (130) or to the PCB (160) to provide an electrically conducting connection between the lens (110) and the lens holder (130) or PCB (180). In one arrangement, the conducting element (200, 300, 400, 500, 600) is resilient. In one arrangement, the conducting element (200, 300, 400, 500, 600) comprises first and second engagement surfaces, said engagement surfaces biased to engage with corresponding portions of a bearing surface of the lens (110) and a bearing surface of the lens holder (130) or the PCB (160). The conducting element is resilient and does not affect the optical alignment of the lens to the lens holder and the imaging system at the adhesive layer. The properties and configuration of the conducting element are such that the electrically conducting coupling is provided independently of the attachment of the lens holder.

In one embodiment of the first aspect, the conducting element (300, 400, 500, 600) is configured for coupling to the lens (110) and to the lens holder (130), wherein the lens holder (130) is further configured for coupling to the PCB (180) to provide an electrically grounded connection between the lens (110) and the PCB (180).

In one embodiment of the first aspect the conducting element is configured for coupling the lens to the lens holder which is further electrically coupled to the PCB. The electrical grounding of the lens to the PCB is provided via the conducting element and via the lens holder.

In one embodiment of the first aspect the conducting element (400, 500, 600) is configured to be coupled externally to the lens and to the lens holder. The conducting element is configured to be located externally on the lens and lens holder which provides excellent flexibility in the provision and location of the conducting element. The conducting element may be configured for snap-fitting to the imaging system. It is further configured to provide a clamped engagement of corresponding engagement surfaces or contact portions to ensure the required contact for electrical conduction and to maintain, in a continuous manner, that contact and the electrical conducting connection between components of the imaging system.

In one embodiment of the first aspect, the conducting element (200) is configured for coupling to the lens (110) and to the PCB (180) to provide an electrically grounded connection between the lens (110) and the PCB (180).

In one embodiment of the first aspect, the conducting element (200) is a resilient element comprised of a metal material, and comprising: a support (210) configured in use for engagement with a corresponding bearing surface of the PCB; and one or more contact arms (220) circumferentially spaced apart on the support and extending generally upwardly therefrom; wherein each contact arm (220) comprises an engagement surface (222), and wherein each contact arm (220) is resilient and biased in a direction inwardly relative to the support (210), such that in use when the support is located engaged with the PCB (180) the engagement surface (222) is biased in the direction of a corresponding bearing surface of the lens (110) to provide an electrically conducting contact between the lens (110) and the PCB (180).

Advantageously, the conducting element may be installed during assembly of the imaging system. It may be soldered in place on the PCB located about the optical axis and the imaging device. When the lens is mounted to the lens holder the conducting element contacts the lens at an external surface thereof. The active optical alignment process is continued without the conducting element having any effect thereon. The support has a generally annular form and is dimensioned to be located on the PCB surrounding the imaging device. The lens is coupled directly to the PCB. Advantageously, the coupling of the conducting element to the lens and lens holder or PCB does not affect the optical alignment. The conducting element is configured for coupling to the lens separately to and independently from the attachment of the lens to the lens holder and the optical alignment of the components of the imaging system. The conducting element is configured such that any contact or contact forces between the lens and PCB or lens holder do not affect the optical alignment of the imaging system. Advantageously the conducting element is also biased to directly engage both the lens and the lens holder or PCB in a positive engagement to maintain the electrically conducting coupling. The electrically conducting coupling is independent from the attachment of the lens and lens holder and the optically aligned coupling.

In one embodiment of the first aspect, the lens (110) is attached to the lens holder (130) at an interface I between a first upper bearing surface (117) of the lens (110) and a second lower bearing surface (150) of the lens holder (130), wherein the lens (110) is attachable to the lens holder (130) at an adhesive layer (191) being located between the bearing surfaces at a first interface portion (150-1, 117-1); wherein one or more recesses (159, 159') are provided at a second interface portion (150-2, 117-2) between the first bearing surface and the second bearing surface; and wherein the conducting element (300, 400, 500, 600) is configured for engagement with the bearing surfaces (117, 150) of the lens and the lens holder at one or more corresponding recesses (155, 159).

The imaging system has an optical axis and each of the imaging device, lens and lens holder being arranged along the optical axis, the lens holder is configured for assembly to the PCB to define a housing for the imaging device, the lens being mountable to the lens holder. Further in the arrangement the lens is configured to be attached to the lens holder using an adhesive such that the lens is optically aligned with the imaging device. The imaging system comprises one or more recesses located at the interface between the lens and the lens holder receiving a portion of the conducting element. There is flexibility in the location and in the form and dimensions of the one or more recesses. In a preferred arrangement a recess may be provided that extends circumferentially between the bearing surfaces at a portion of the interface near to the external peripheral walls of the lens and the lens holder. However, it will be appreciated that the one or more recesses may be provided located at different portions of the interface, or that in another arrangement the one or more recesses be circumferentially spaced apart.

In one embodiment of the first aspect, each recess (159, 159') is at least partially defined by the adhesive layer (191), and portions of the first and second bearing surfaces (117, 150) of the lens (110) and lens holder (130) adjacent to the adhesive layer (191), said bearing surfaces being spaced apart in the vertical direction (Z) by the adhesive layer (191) located therebetween.

The one or more recesses may be provided at a portion of the interface adjacent to the adhesive layer. In such a case, the recess is defined by the adhesive layer to the side and the bearing surfaces above and below. The one or more recesses may be formed between the lens and the lens holder at an external peripheral portion. In one arrangement, for example, the external peripheral portions at the external edges of the lens and lens holder may be formed or tapered to provide one or more recesses.

In one embodiment of the first aspect, at least one recess (159') is at least partially defined by a groove (155) mechanically formed in one or both of the bearing surfaces of the lens and lens holder.

The one or more recesses may include at least one that is mechanically formed in one or both of the lens and the lens holder.

In one embodiment of the first aspect, the conducting element (300) comprises a conducting adhesive or paste (310, 311). In one arrangement, the conducting element (300) comprises a conducting adhesive or paste (310, 311) provided in a conducting layer (301) in the recess (159, 159') arranged such that engagement surfaces of the conducting layer are in contact with corresponding portions of bearing surfaces (117, 150) of each of the lens and the lens holder at the recess (155, 159) to provide an electrically conducting connection between the lens and the lens holder.

The conducting element may be provided as a conducting adhesive or paste that is locatable between the bearing surfaces and adjacent to the adhesive layer. The properties of the conducting element are such that it does not affect the optical alignment of the system which is fixed at the adhesive layer. The conducting element is resilient and deforms for locating in contact with the bearing surfaces. The conducting element as defined, and the arrangement of the imaging system according to the claims, provide excellent flexibility in assembly and in the location thereof.

In one embodiment of the first aspect, the conducting element (400, 500) comprises: a support (410, 510) configured in use for engagement with a corresponding bearing surface of the lens or the lens holder; and one or more contact arms (420, 520) circumferentially spaced apart on the support and extending therefrom; wherein each contact arm (420, 520) comprises an engagement surface (422, 522), and wherein each contact arm (420, 520) is resilient and biased in a direction inwardly relative to the support (410, 510), such that in use when the support (410, 510) is located on externally on the lens or the lens holder, the engagement surface (422, 522) is configured for engagement in a corresponding recess (159, 159') such that the conducting element is in contact with a corresponding bearing surface of each of the lens and the lens holder to provide an electrically conducting connection between the lens and the lens holder.

In one embodiment of the first aspect, in use, the support (410) of the conducting element (400) is receivable at an external portion (145) of the lens holder (130) and wherein the one or more contact arms (420) extend upwardly from the support in the direction of the lens (110). The conducting element has a form and dimensions for location on the lens holder. The conducting element is resilient and may be configured to expand for location on the lens holder and to contract to engage with the lens holder. The contact arms are biased to engage with the lens. In one arrangement, in use, the support (510) of the conducting element is receivable at an external portion (115, 116) of the lens (110) and wherein the one or more contact arms (520) extend downwardly from the support in the direction of the lens holder (130). The conducting element has a form and dimensions for location on the lens holder. The conducting element is resilient and may be configured to expand for location on the lens and to contact to engage with the lens. The contact arms are biased to engage with the lens holder.

In one embodiment of the first aspect, the conducting element (600) comprises: a support (610) comprising a support wall (611) having a first internal peripheral wall and a second external peripheral wall surface (615) and extending between a first end (618) and a second end (619) with an opening therebetween, in a C-shaped form; the support (610) configured to expand for locating externally on the lens and the lens holder near the interface I, wherein the internal peripheral wall comprises an engagement surface (622) for engagement with corresponding portions of both the lens and the lens holder to provide an electrically conducting connection between the lens and the lens holder.

In one embodiment of the first aspect, the engagement surface (622) comprises one or more protrusions (624) formed protruding inwardly relative to the engagement surface in the direction of the lens and lens holder, each protrusion being receivable in the recess (159, 159').

In one embodiment of the first aspect, wherein the protrusion (624) comprises a ridge arranged extending circumferentially around the interface peripheral wall.

Various forms of conducting element are provided for coupling externally to the imaging system. Each advantageously provides excellent flexibility in use and in the manufacturing process. Further each advantageously provides a direct electrically conducting connection between the lens and the lens holder without affecting the optical alignment of the imaging system.

In one embodiment of the first aspect, wherein the support (410, 510, 610) has C-shaped form or an annular ring-shaped form and is configured to be located externally on the lens and/or the lens holder. The form of the conducting element can be varied. A conducting element of C-shaped for annular form provides for ease of location on the imaging system either by placement over a component of the imaging system or by receiving a component thereof through an opening. The extent of contact or contacting overlap provided between the conducting element and the lens and lens holder may also be varied with flexibility. In some arrangements the conducting element extends circumferentially (360 degrees) around the corresponding component(s). However, the conducting element may also be configured to extended in the circumferential direction around a more limited portion of the corresponding component(s).

In one embodiment of the first aspect, the engagement surface comprises a protrusion (424, 524) receivable in the recess (159, 155) at the interface I.

In one embodiment of the first aspect, the conducting element is arranged according to one or more of the following: (i) wherein the engagement surface is comprised of a metal and is electrically conducting; (ii) wherein the conducting element is comprised of a metal material and is electrically conducting.

In one embodiment of the first aspect, the support is resilient and is deformable for locating on the body of the lens and/or the lens holder and is biased to engage with the body of the lens and/or the lens holder.

According to a further aspect, the specification provides exemplary arrangement of a conducting element for providing an electrically conducting connection between a lens of an imaging system and at least one of a lens holder and a PCB.

In one embodiment of the second aspect, there is provided an electrically conducting element for providing an electrical grounding of a lens (110) of an imaging system (100), the imaging system (100) comprising a plurality of components including an imaging device (160) mounted on the PCB (180), a lens (110), and a lens holder (130); the electrically conducting element (200, 300, 400, 500, 600) being configured in use for coupling directly to the lens (110) and to one of the lens holder (130) and the PCB (160) to provide an electrically conducting connection between the lens (110) and the lens holder (130) or PCB (180); wherein the electrically conducting element (200, 300, 400, 500, 600) is resilient and comprises first and second engagement surfaces biased to engage with corresponding portions of a bearing surface of the lens (110) and a bearing surface of the lens holder (130) or the PCB (160).

In one embodiment of the second aspect, there is provided the electrically conducting element comprises a conducting paste or adhesive.

In one arrangement, the conducting element (400, 500) comprises: a support (410, 510) configured in use for engagement with a corresponding bearing surface of the lens or the lens holder; and one or more contact arms (420, 520) circumferentially spaced apart on the support and extending therefrom; wherein each contact arm (420, 520) comprises an engagement surface (422, 522), and wherein each contact arm (420, 520) is resilient and biased in a direction inwardly relative to the support (410, 510), such that in use when the support (410, 510) is located on externally on the lens or the lens holder, the engagement surface (422, 522) is configured for engagement at an interface between the lens and the lens holder such that the conducting element is in contact with a corresponding bearing surface of each of the lens and the lens holder to provide an electrically conducting connection between the lens and the lens holder.

In one embodiment of the second aspect, the conducting element (200) is a resilient element comprised of a metal material, and comprising: a support (210) configured in use for engagement with a corresponding bearing surface of the PCB; and one or more contact arms (220) circumferentially spaced apart on the support and extending generally upwardly therefrom; wherein each contact arm (220) comprises an engagement surface (222), and wherein each contact arm (220) is resilient and biased in a direction inwardly relative to the support (210), such that in use when the support is located engaged with the PCB (180) the engagement surface (222) is biased in the direction of a corresponding bearing surface of the lens (110) to provide an electrically conducting contact between the lens (110) and the PCB (180).

In one embodiment of the second aspect, the conducting element (600) comprises: a support (610) comprising a support wall (611) having a first internal peripheral wall and a second external peripheral wall surface (615) and extending between a first end (618) and a second end (619) with an opening therebetween, in a C-shaped form; the support (610) configured to expand for locating externally on the lens and the lens holder near an interface I between a bearing surface of the lens and a bearing surface of the lens holder, wherein the internal peripheral wall comprises an engagement surface (622) for engagement with corresponding portions of both the lens and the lens holder to provide an electrically conducting connection between the lens and the lens holder.

As described, the specification provides various advantageous arrangements of conducting elements for providing an electrical grounding connection between a lens and a PCB of an imaging system.

BRIEF DESCRIPTION OF THE DRAWINGS

The following drawings are provided as an example to explain further and describe various aspects of the present disclosure:

FIG. 3A provides a perspective view of a imaging system of the component parts of an imaging system according to an arrangement of the present specification; FIG. 3B plan view from the side of the lens holder of FIG. 3A; FIG. 3C is a perspective view of the arrangement of FIG. 3A when assembled; FIG. 3D is a perspective view of a conducting element according to the arrangement of the specification and of FIG. 3A; FIG. 3E is a close-up perspective view of the lens support and receiver of the arrangement of FIG. 3A;

FIG. 4A provides a close-up perspective view of a conducting element of a further exemplary arrangement of the specification; FIG. 4B perspective view from the side of the an imaging system according to a further arrangement and including the conducting element of FIG. 4A showing the imaging system and the conducting element to be assembled thereto; FIG. 4C is a perspective view of the arrangement of FIG. 4B when assembled, and FIG. 4D is a perspective view showing a cross-section of the imaging system of FIG. 4C with the conducting element in place; FIGS. 5A and 5B show perspective views of the imaging system and the conducting element before and after assembly; FIG. 5C is a top plan view of the arrangement of FIG. 5A; FIG. 5D shows a close-up perspective view of the conducting element; and FIG. 5E shows a side-view cross-section of the imaging system of FIG. 5A.

DETAILED DESCRIPTION

Figure 1A:
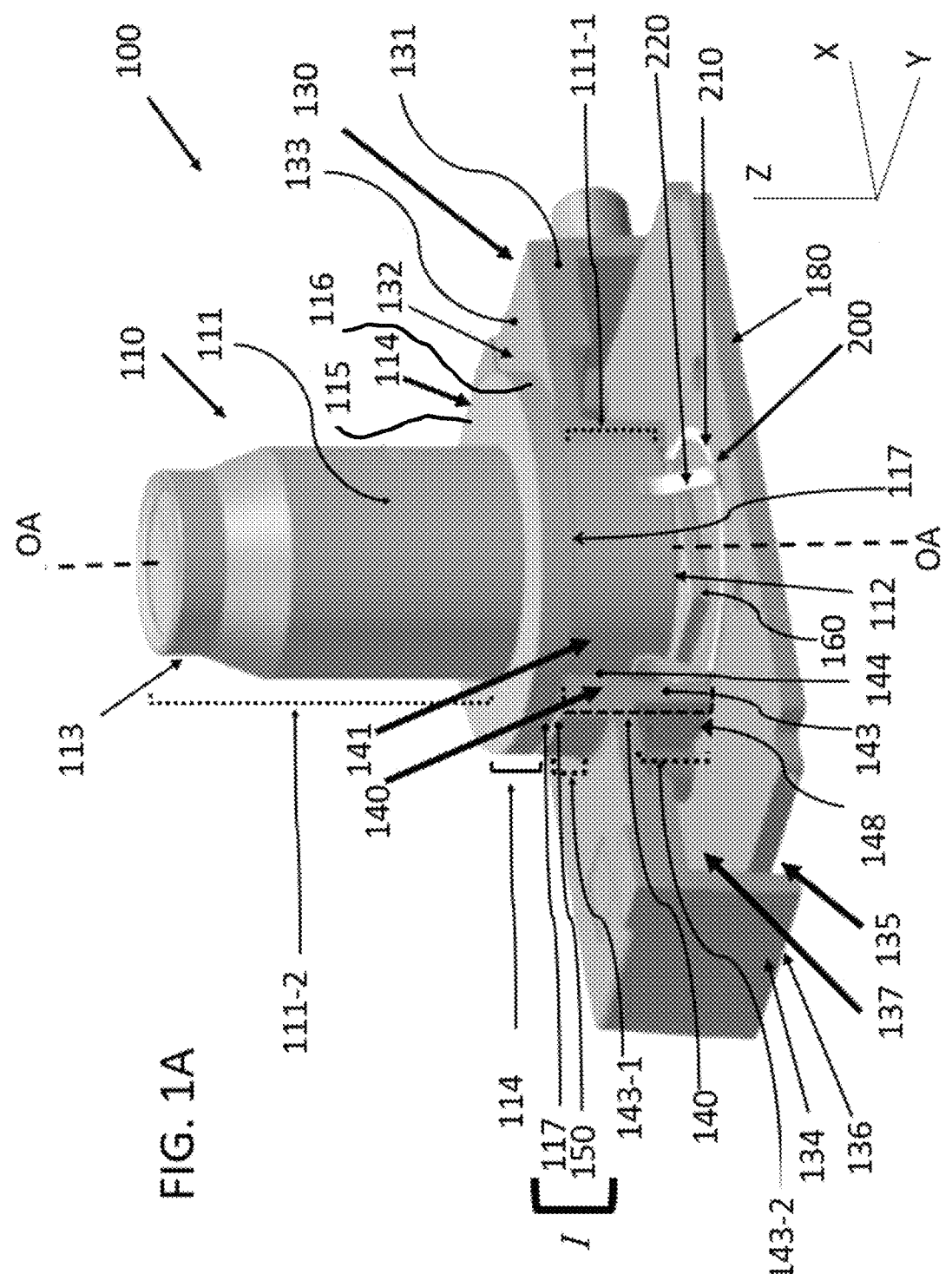
FIG. 1A provides a cross-sectional perspective view of an imaging system according to an arrangement of the present specification and FIG. 1B provides a close-up view of the lens mounting arrangement of FIG. 1A, FIG. 2A provides a cross-sectional perspective view of an imaging system according to an alternative arrangement of the present specification.

The following discussion provides many exemplary embodiments of the inventive subject matter. Although each embodiment represents a single combination of inventive elements, the inventive subject matter is considered to include all possible combinations of the disclosed elements. Thus, if one embodiment comprises elements A, B, and C, and a second embodiment comprises elements B and D, then the inventive subject matter is also considered to include other remaining combinations of A, B, C, or D, even if not explicitly disclosed.

For simplicity and clarity of illustration, reference numerals may be repeated among the Figures to indicate corresponding or analogous elements. Numerous details are set forth to provide an understanding of the examples described herein. The examples may be practised without these details. In other instances, well-known methods, procedures, and components are not described in detail to avoid obscuring the examples described. The description is not to be considered as limiting to the scope of the examples described herein.

The present application relates in general to an imaging system comprising an imaging device and lens. The imaging system provides an improved mounting arrangement for mounting the lens within the imaging system.

Figure 1B:
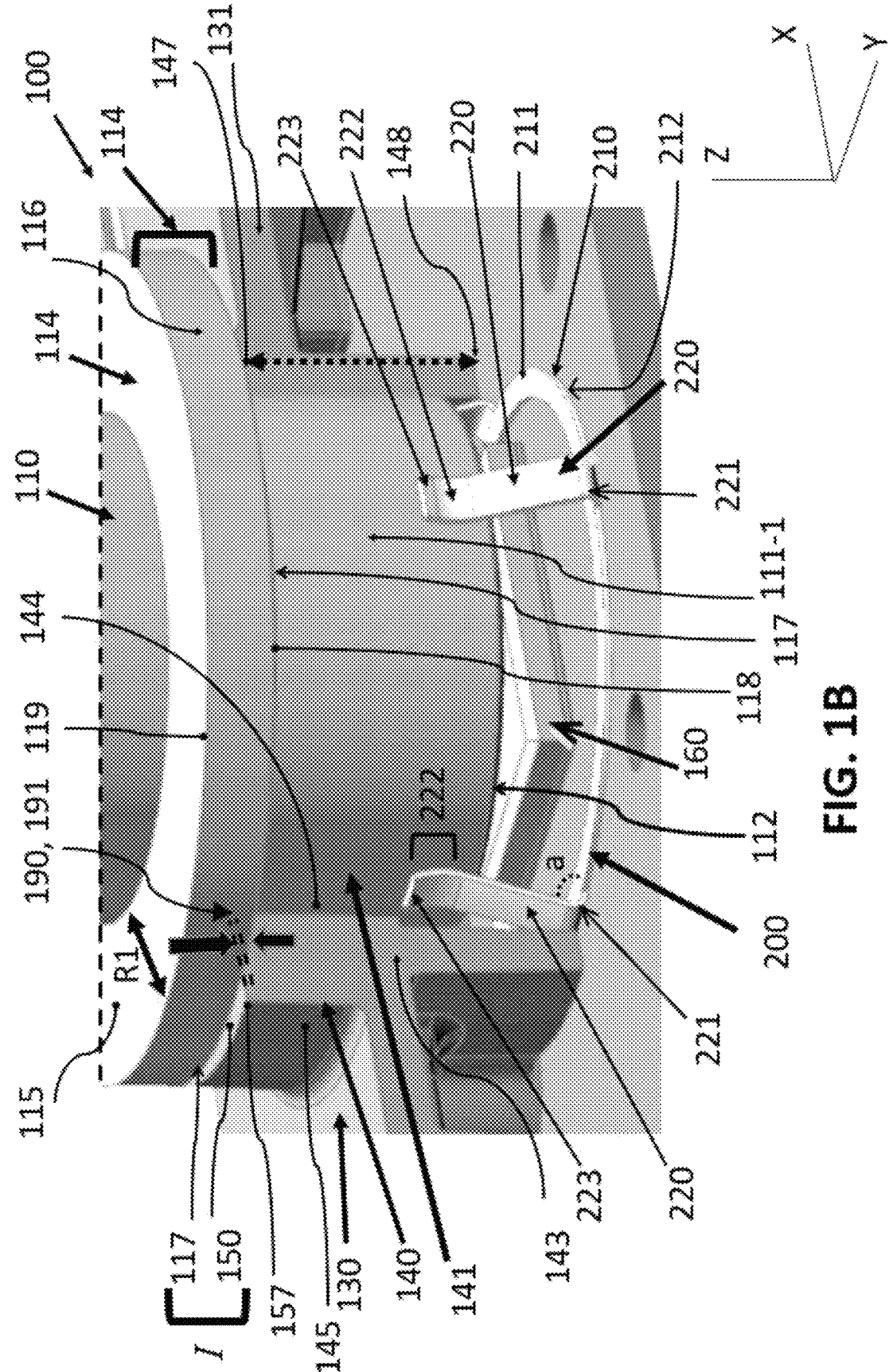

The present specification relates to arrangements of an imaging system 100. Referring to FIGS. 1A and 1B an imaging system 100 according to an exemplary arrangement of the specification is described. The imaging system 100 comprises a lens 110, a lens holder 130, and an imaging device 160. In one arrangement, the imaging device 160 may be a camera or a PCB camera 160. The imaging device 160 and components are mounted to a printed circuit board, PCB, 180. During assembly, the PCB 180 comprising the imaging device 160 is assembled to the lens holder 130. The lens 110 is mountable to the lens holder 130, thus coupling it to the imaging device.

The optical axis, OA of the imaging system 100 is defined by the central vertical axis as indicated in FIG. 1A (Z-direction). Each of the lens 110, lens holder 130 and imaging device 160 are arranged about the central vertical axis/ optical axis thereof. The optical axes OA of the camera and the lens are arranged in alignment. In manufacture and assembly of the imaging system 100, high levels of precision are applied to ensure that the optical components are aligned to provide the required image quality. A correct and precise mounting of the lens in the lens holder, and of the imaging device relative to the lens holder and lens, are critical to providing the required optical arrangement. The lens 110 is attached to the lens holder 130 during an active alignment procedure to provide the required optical alignment of the lens and the camera. During this procedure, the lens is positioned in the lens holder and attached thereto using an adhesive 190 which is provided in an adhesive layer 191 at an interface I between the lens 110 and the lens holder 130.

The 110 has a lens body 111 of generally cylindrical form. When assembled to the PCB 180, a proximal end 112 of the lens body is located proximate to the imaging device and a distal end faces 113 outwardly in the direction of the scene to be imaged. The lens body 111 comprises a lens mount 114. The lens mount 114 is arranged between the proximal 111-1 and distal 111-2 portions of the lens body. The lens mount 114 is defined by a collar that extends circumferentially around the lens body 111. In the arrangement shown, the lens mount 114 has an annular ring-shaped form. Lens mount 114 has a lower surface 117, an upper surface 115, and an external peripheral side wall 116 extending therebetween. The side wall 116 comprises a lower peripheral edge 118 and an upper peripheral edge 119. The radial extent from the lens body 111 to the peripheral side wall 116 is R1. The lower surface defines a contact surface 117, also referred to a bearing surface 117, configured in use for coupling to a corresponding contact surface 150, or bearing surface 150, of the lens holder 130. The lens mount, lens holder and the contact surfaces 117 and 150 thereof, are formed for conformity and coupling.

Lens holder 130 comprises a lens holder body 131 having an upper wall 132 and depending outer side walls 134. The upper wall 132 comprises an outwardly facing external surface 133. A lower opening 135 is defined by lower peripheral edge surfaces 136 of the outer side walls 134. The lens holder 130 defines a housing 137. When the imaging system 100 is assembled, components thereof including a portion of the lens and the imaging device are located within the interior of the housing 137. The PCB 180, to which imaging device 160 is mounted, is receivable within the lens holder 130 at the lower opening 135 thereof.

The lens holder 130 further comprises a lens support 140 comprising a lens receiver 141 for receiving the proximal portion 111-1 of the lens body 111. The lens support 140 is configured for mounting the lens 110 to the lens holder 130. The lens support 140 comprises a lens support wall 143 that extends between an upper opening 147 and a lower opening 148. An upper portion 143-1 of the support wall extends upwardly relative to the upper wall 132 of the housing and a lower portion 143-2 depends relative thereto. The lens support wall 143 in the arrangement of the drawings is of a generally cylindrical form having an external peripheral surface 145 and an internal peripheral surface 144. The internal peripheral surface 144 of the wall 143 defines the lens receiver 141. The lens support 140 comprises an upper surface 150 located around opening 147. The upper surface 150 defines the contact surface 150 or bearing surface 150 at which the lens holder 130 is coupled to the lens mount 114 of the lens 110. As illustrated in the examples of FIGS. 2c and 3e and applicable also to the exemplary arrangement of FIG. 1, the upper contact surface 150 has a ring-shaped or annular form and extends between an inner peripheral edge 158 and an outer peripheral edge 157. The contact surface 150 has an inner radius R2 and an outer radius R3.

The manufacturing and assembly process includes 2 main assembly steps. The lens holder 130 and PCB 180 are assembled together. The lens 10 is mounted to the lens holder 130 such that the lens and camera are arranged along the optical path of the imaging system.

The PCB 180 is receivable in the lens holder 130. The PCB and lens holder are formed for conformity.

The interface between the lens 110 and lens holder 130 comprises adhesive layer 191 comprising the adhesive 190 located between the lower contact surface 117 of the lens mount 114 and the upper contact surface 150 of the lens support 140. The adhesive 190 is used to attach the lens to the lens holder. As noted above, the lens is attached to the lens holder during an active alignment process. It is critical that the lens 110 is at the correct optical alignment relative to the imaging device when fixed to the lens holder 130. When the required alignment is achieved, the lens is fixed to the lens holder. The adhesive 190 may be curable or fixed in another suitable way to form the adhesive layer 191. As shown with reference to FIGS. 3A and 3D the adhesive 190/adhesive layer 191 may be provided for location at the interface between the surfaces of the mount and the lens support. Adhesive 190 in the exemplary arrangement is an epoxy adhesive. Other suitable adhesives having the required properties may also be used. The adhesive 190 in use stabilizes the connection between the lens and the lens holder for thermal cycling with micron level tolerance. The position of the lens relative to the lens holder and the optical alignment thereof is not affected for example by heating by virtue of the properties of the adhesive. The adhesive 190 is non-conducting and therefore there is no electrically conducting connection between the lens mount 114 and the lens holder 130 at the interface I. Further at this stage of the assembly where the lens is attached, as described to the lens holder, there is no electrically conducting connection between the lens and the PCB. It will be appreciated that the adhesive or adhesive layer may be provided in different forms suitable for providing the required attachment and alignment of the components.

The imaging system 100, further comprises a conducting element 200. The conducting element 200 is configured to provide an electrically conducting contact between the lens and the PCB to provide an electrical grounding of the lens to the PCB.

Referring to FIG. 1B, the conducting element 200 comprises a support 210 of annular form having an upper surface 211 and a lower surface 212. The support 210 comprises one or more contact arms 220 which extend upwardly therefrom and are circumferentially spaced apart around the support. The support 210 may for example be C-shaped or O-shaped a closed ring form. Each contact arm 220 comprises a lower support connection end 221 and an upper end 223, and a contact 222 arranged therebetween. The contact arm 220 is arranged at rest such that the arms is inclined at an angle a less than 90 degrees relative to the support 210 and such that the contact 222 is tensioned inwardly relative to the support.

The contact 222 is configured to engage with a corresponding contact location of a bearing surface. The contact 222 is arranged at an angle to the contact arm, and oriented generally vertically to clamp to a vertically oriented bearing surface.

In use, the support 210 is located such that the lower surface 212 is in contact with the PCB 190 and the support extends about the imaging device 160. The one or more contact arms 220 extend generally upwardly in the direction of the lens 110. Each contact arm 220 is resilient and tensioned inwardly relative to the support 210, such that in use, the contact arm is biased in the direction of the lens body 111. The support, contact arm and contact have a form and dimensions to provide engagement of the contact with the lens body in an electrically conducting contact.

The support 210 has a generally annular form (for example O or C-shaped) and a diameter greater than that of the lens body. The support is further dimensioned such that when located on the PCB it extends about or surrounds the imaging device. Further the conducting element 200 is configured to be located engaged on the PCB generally between the lens holder and the imaging device and between the lens holder and the lens body. The conducting element is configured to directly provide an electrically conductive coupling of the lens body to the PCB. The form and dimensions of the support are such that it is configured to be soldered directly onto the PCB. In the exemplary arrangement illustrated, the conducting element 200 has a plurality of contact arms 220 arranged circumferentially spaced apart about the support—this arrangement allows for a corresponding plurality of contacts between the lens body and PCB that are evenly distributed about the lens body. In preferred arrangements, the conducting element 200 may comprise 2, 3, or 4 or more contact arms 220 spaced apart at equal intervals about the support 210.

The support of the arrangement of FIG. 1 further comprises a substantially flat or planar ring form having an inner peripheral edge and an outer peripheral edge. The web of the support is substantially flat or planar defining the ring or annular form support. The lower surface of which defines a bearing surface for contacting the PCB. The support is located spaced apart from the lens body and the at least one contact arm of the support is arranged to contact the lens body at an external contact area thereof. The inner peripheral edge of the support defines an inner opening in which the imaging device is located. The form of the support, having a planar web provides a stable support at the PCB. The outer edge defines the outer periphery of the support. The contact arms are located projecting from the outer edge in the direction of the centre of the support. In use, the lower surface of the support is engaged with the planar surface of the PCB. The planar ring form provides for a stable location of the conducting element on the PCB such that the lower surface of the support is arranged in contact with a corresponding portion of an upper surface the PCB.

The conducting element has a lightweight and streamlined form which is configured to provide a stable connection between the lens body and PCB. The support is configured for fixing to the PCB to provide a stable anchoring thereof within the imaging system, while also spaced apart from the optical elements including the lens body and imaging device. The imaging system is provided as an optically aligned system and the arrangement of the conducting element allows for an electrically conducting coupling between the lens and the PCB without affecting the stability or alignment of the optical element. The arrangement also provides for increased ease in assembly—the lens is attached to the lens holder and relative to the imaging device such that the optical elements are precisely aligned as required. The conducting element is configured such that the conducting connection may be provided after the optical alignment step of assembly and further such that the conducting element does not affect the optical alignment of the imaging system as the conducting element is configured to be located externally to the optical elements.

The conducting element 200 defines a lens grounding element. The conducting element 200 is in effect a conducting spring element configured to provide an electrical grounding connection between the lens and the PCB. The conducting element is resilient. The conducting element comprises a metal and is configured to be electrically conducting.

In use and during manufacture, in an exemplary method conducting element 200 as shown in the drawings is soldered to the PCB as another component. When the PCB is assembled with lens holder, the conducting element is provided located at the lens receiver. During the active alignment process conducting element 200 contacts the lens and provides an electrical contact between PCB and lens. In the arrangement shown, in use the support 210 is arranged in an electrically conducting contact with the PCB and the contact 222 of the contact arms 220 is engaged in conducting contact with the lens 110. The engagement between the contact 222 and a corresponding portion of a bearing surface of the lens is achieved by the configuration, dimensions and form of conducting element, and the biasing of the contact arms.

The conducting element 200 advantageously addresses problems and issues due to noise and/or EMC in previous imaging system arrangements, by providing an electrical grounding coupling of the lens to the PCB. Further, by virtue of the configuration of the conducting element 200, having resilient contact arms 220, the conducting element does not affect the alignment process and does not affect the optical alignment of the system. The conducting element as configured has tolerance that provides an excellent flexibility and ease of application in manufacture and use.

The imaging system 100 comprising the conducting element 200 is advantageously configured such that an electrical grounding connection is provided between lens and lens holder and that the lens is grounded to the PCB.

Figures 2A, 2B:
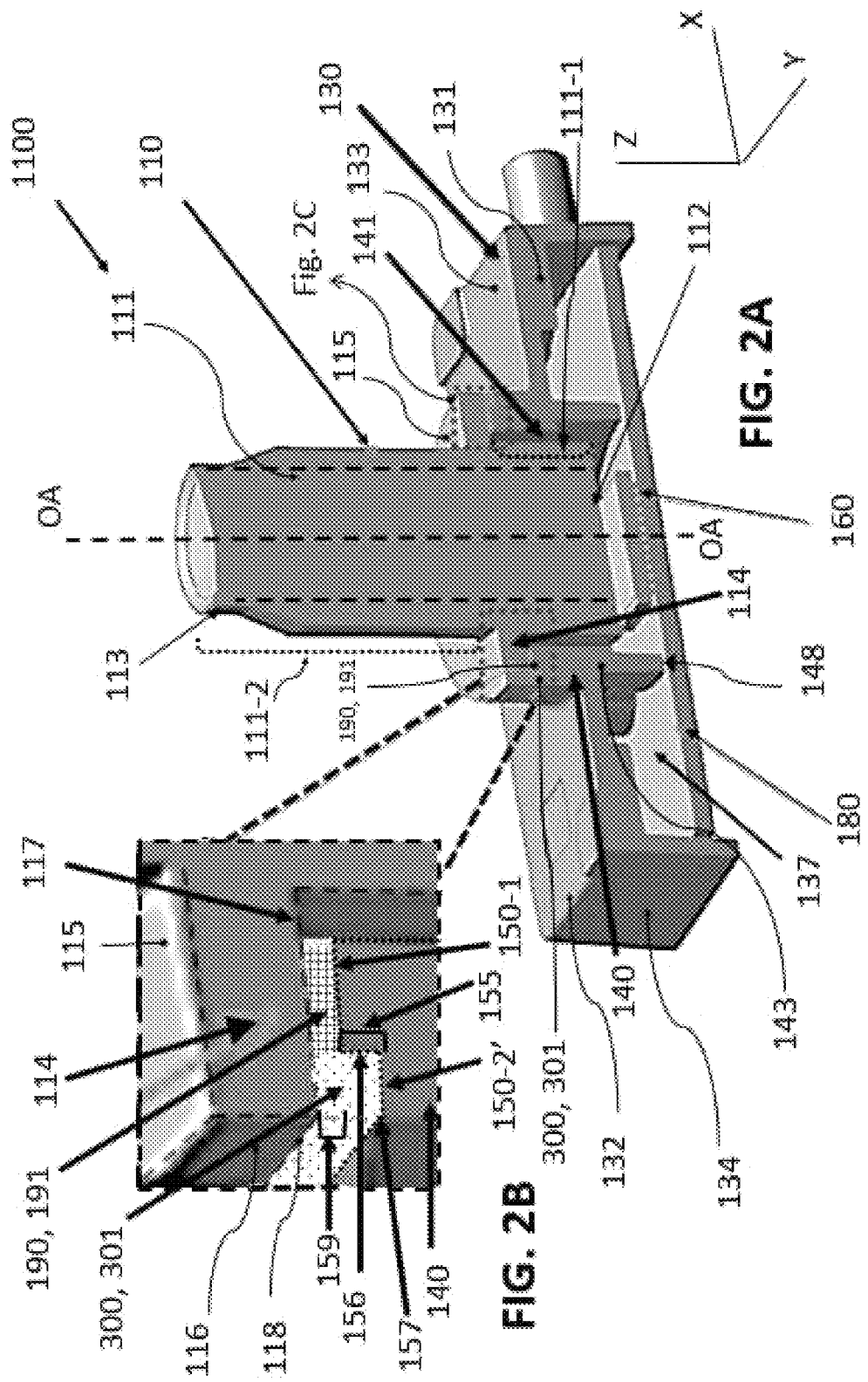
FIGS. 2B and 2C provide close-up view of the interface at which the lens is mounted to the lens holder.
Figure 2C:
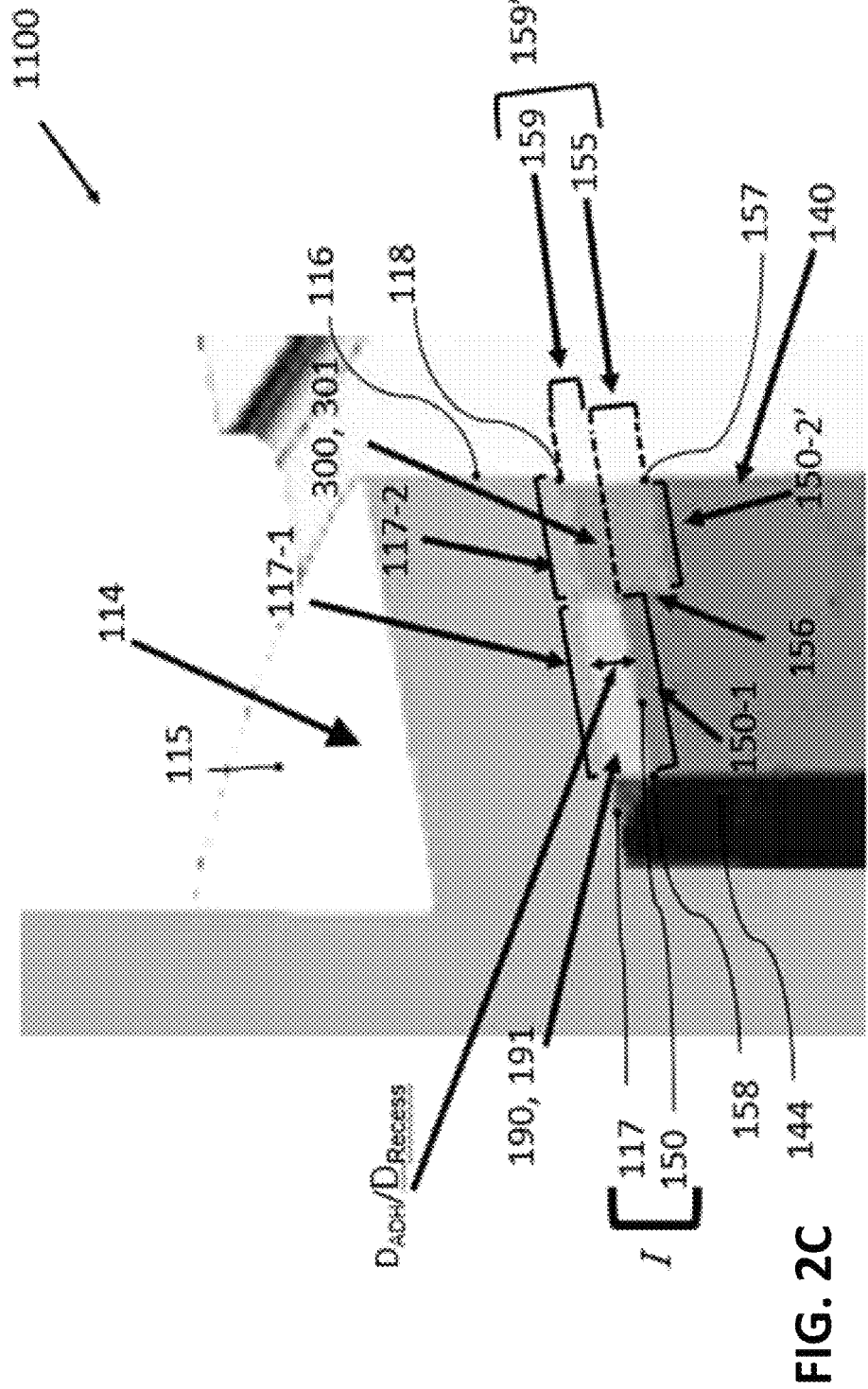

Referring to FIGS. 2A, 2B and 2C, an alternative arrangement of an imaging system 1100 according to the specification is described. The arrangement includes a conducting element 300. The imaging system 1100 according to FIG. 2 has features in common with imaging system 100 including the lens, lens holder, imaging device and the PCB, and the same reference numbers have been used in the drawings where appropriate. Reference is made to the description provided above with respect to imaging system 100 of FIG. 1, much of which applies also to the imaging system 1100.

Imaging system 1100 comprises a lens 110, lens holder 130, imaging device 160 and PCB 180. As described above with reference to FIG. 1, the lens 110 and lens holder 130 of the arrangement of FIG. 2 are attached at an adhesive layer 191 formed of adhesive 190 during an active alignment process. The lens and lens holder are attached at the adhesive layer 191 arranged between contact surface 117 of lens mount 114 and contact surface 150 of lens support 140 of the lens holder. The adhesive layer 191 is arranged such that the lens is oriented and aligned optically, as required within the imaging system. The adhesive is non-conducting and provides a stable connection at the interface between the lens and lens holder to maintain the optical arrangement. The interface I between the lens and lens support is the interface formed between the contact surfaces 117 and 150. The adhesive layer 191 of adhesive 190 is located extending between at least portions of each of the surfaces.

The imaging system 1100 further comprises a conducting element 300. The conducting element 300 of FIG. 2 defines a lens grounding element configured to provide an electrically conducting connection between the lens 110 and lens holder 130. The lens holder is further connected to the PCB to provide an electrical ground of the lens to the PCB via the lens holder.

The conducting element 300 comprises a conductive adhesive 310 or a conductive paste 311. The conducting element 300 is configured to be arranged in contact with both the lower bearing surface 117 of the lens mount 114 and the upper bearing surface 150 of the lens support 140. Conducting element 300 effectively defines a conducting layer 301 arranged to provide an electrically conducting connection between the lens and lens holder. In use when the conducting layer 301 is located in the interface I between the bearing surfaces of the lens mount and the lens support, the conducting element comprises a first upper contact surface 302, arranged in contact with the lens mount, and a second lower contact surface 303 arranged in contact with the lens support. The contact surfaces 302 and 303 of the conducting element 300 are also referred to in the specification as engagement surfaces.

Referring to FIGS. 2A, 2B and 2C, a first adhesive layer 191 of adhesive 190 is located between the surfaces 117 and 150 coupling the lens and lens holder together with the required optical alignment and arrangement. In addition, to the first adhesive layer 191 a second conducting layer 301 is also provided. In the exemplary arrangement of the drawings the layers 191 and 301 arranged radially side by side. The innermost layer is the adhesive layer 191. The adhesive layer 191 is located substantially at an inner radial portion 150-1/117-1 of the interface between the contact surfaces. The conducting element 300 is located substantially at the outer radial portion 150-2/117-2. In each case a layer of the material, the adhesive 190 or the conducting element 300 is provided between the lens and lens holder in the Z direction. The adhesive layer and the conducting element are both arranged to contact each of the opposing bearing surfaces.

The inner radial portion 150-1 and the outer radial portion 150-2 are concentric and arranged radially side by side between the inner peripheral wall of the lens holder and the outer peripheral walls of the lens body and lens holder.

Figures 3A, 3B, 3C:
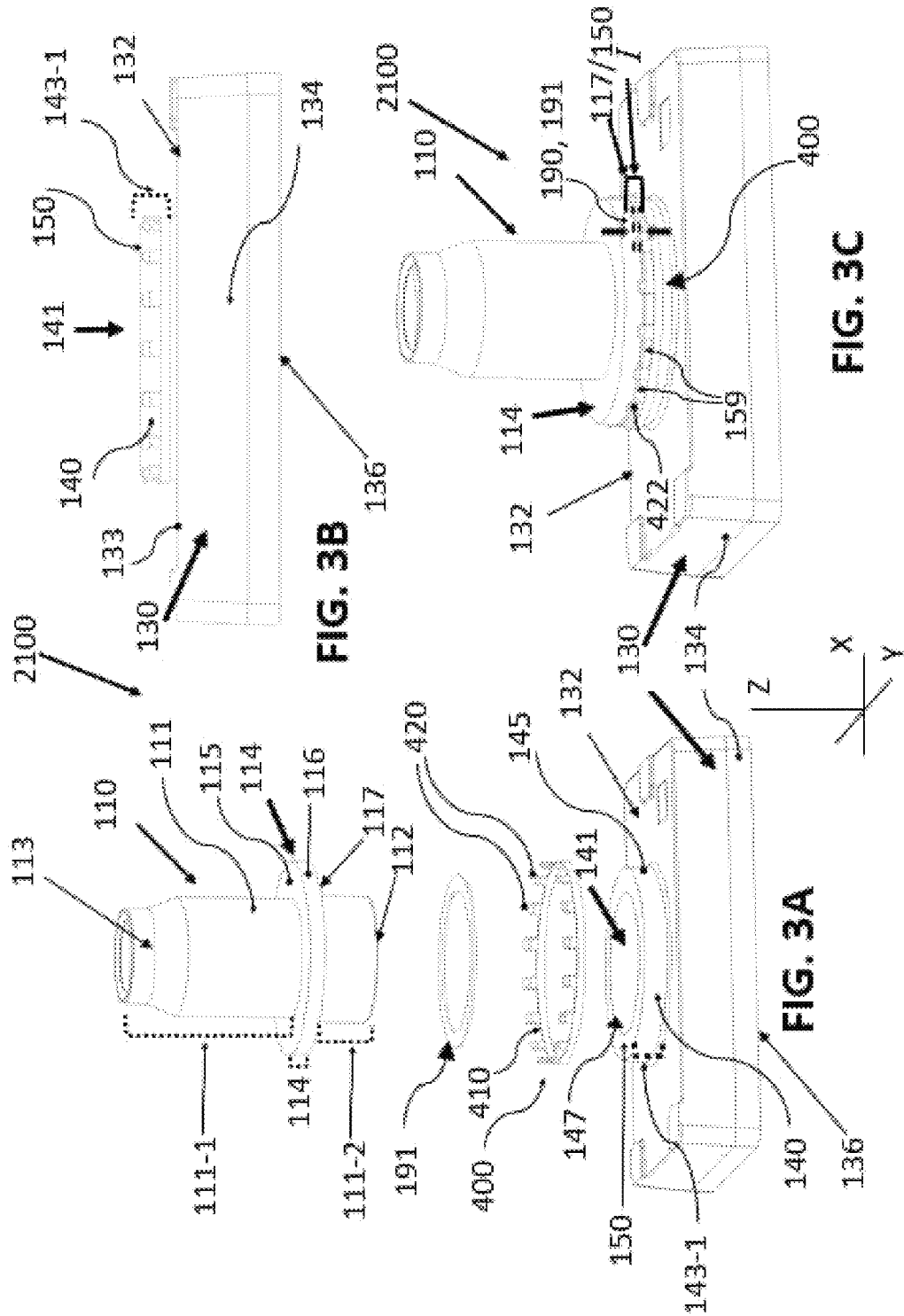
FIGS. 3A to 3E show an alternative arrangement of an imaging system according to the specification.
Figure 3D:
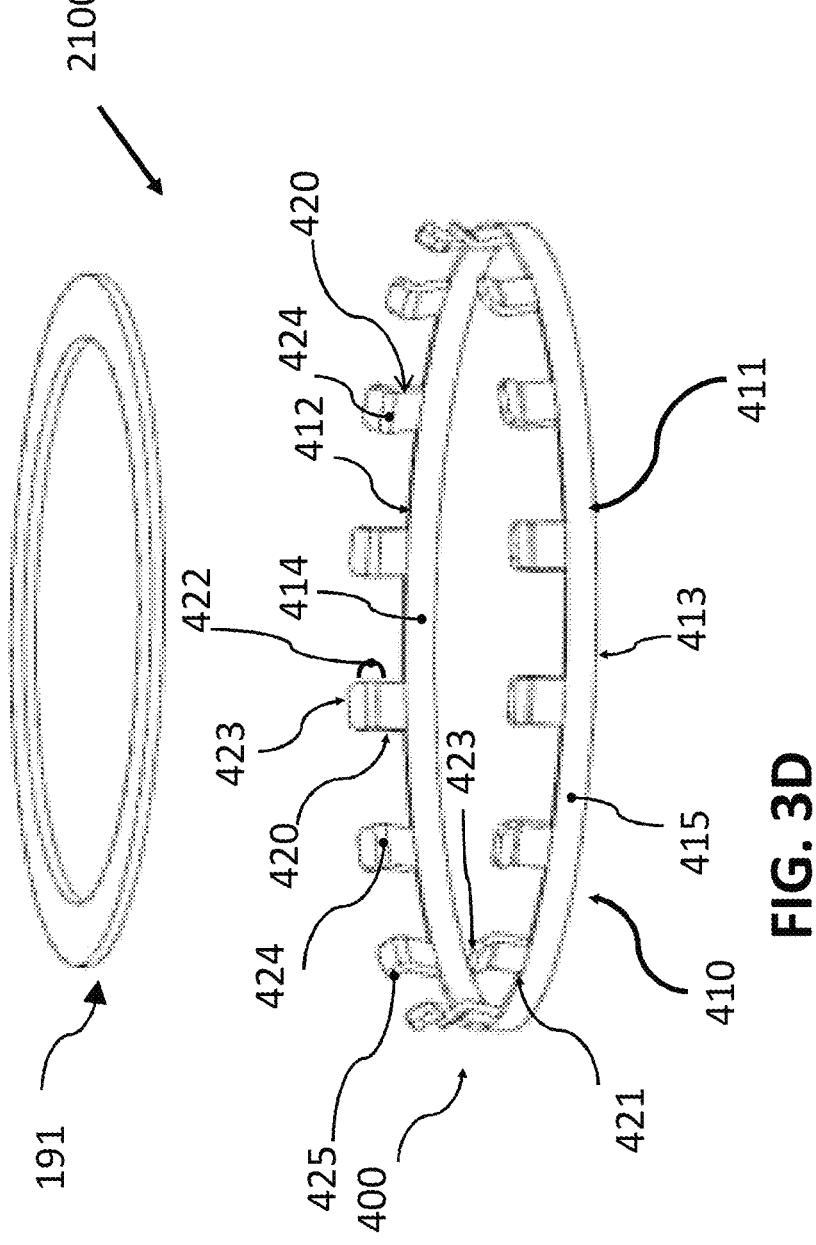
Figure 3E:
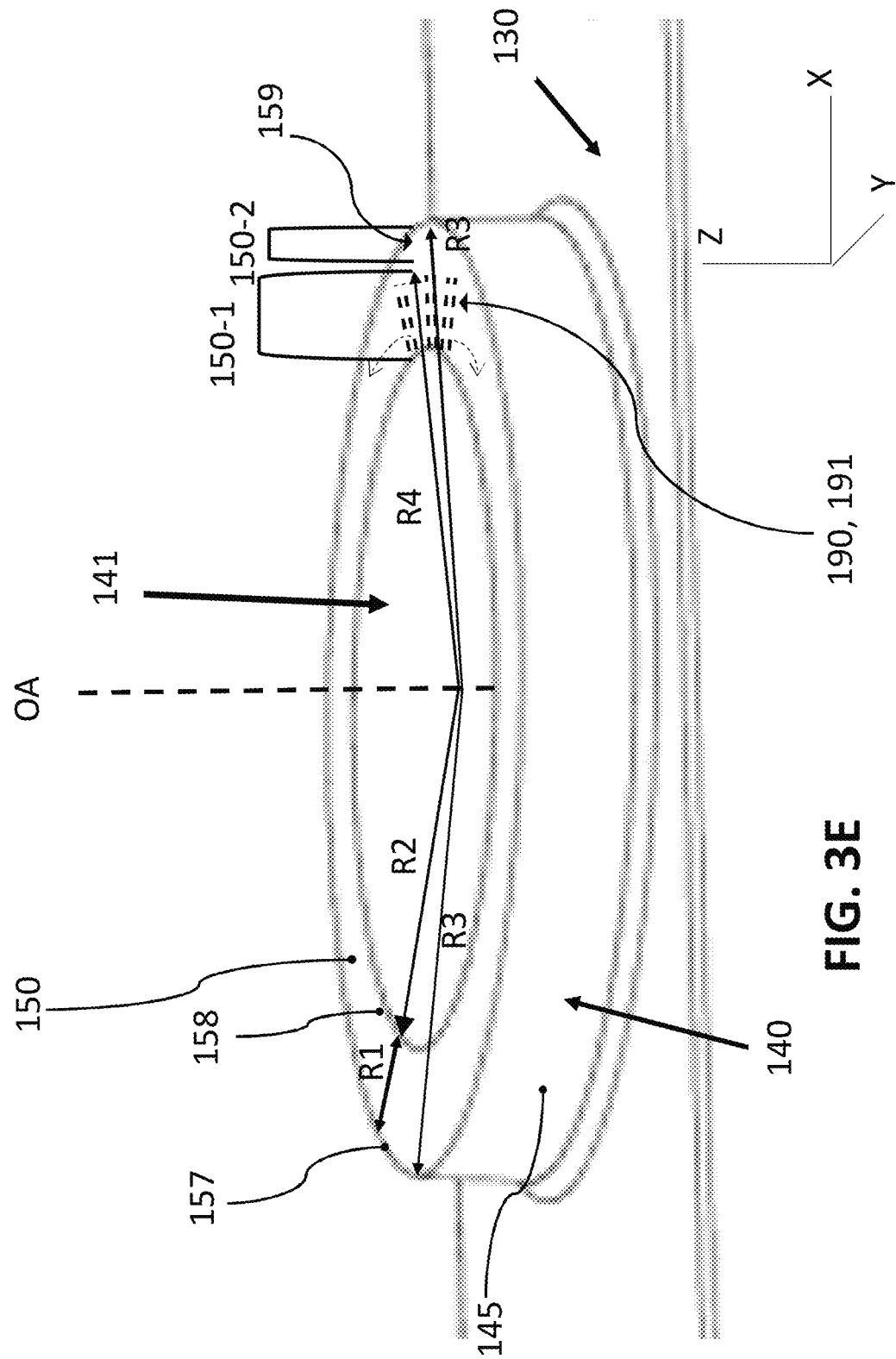

Referring to FIGS. 2B and 2C, it is noted that the location of the adhesive layer 191 substantially at the inner radial portions 150-1/117-1 of the interface between the contact surfaces 150 and 117 effectively defines a recess 159. Recess 159 has a depth $D_{Recess}$ (Z-direction) defined by the depth $D_{ADH}$ of the adhesive layer 191. The recess 159 is located at the interface I substantially between outer radial portions 150-2 and 117-2 of the contact surfaces. The recess 159 is defined by the adhesive layer 191, and the contact surfaces 150 and 117 of the lens holder and lens. The contact surfaces are separated by the adhesive layer 191 which is located therebetween and are also arranged spaced apart at those portions of the contact surface that are adjacent to the adhesive layer, in the examples shown at the contact surfaces 117-2, 150-2. The conducting element 300 is located in a least a portion of the recess 159. In the arrangement of FIG. 2, the conducting element 300 is arranged in a layer 301 that extends in an angular direction circumferentially between the lens and lens holder. As noted above the adhesive layer 191 comprising adhesive 190 may have a form of the type as shown in FIGS. 3A and 3D.

It will be appreciated that various arrangement of the layer 301 may be provided for example the layer 301 may extend along an arc, or one or more arcs, each having an angular extent less than 360 degrees, such that the layer 301 is arranged at one or more locations between the surfaces. It will be appreciated that various alternative arrangements of the conducting element 300 and the adhesive layer 191 may be provided. For example, the conducting element 300 may be applied as one or more beads 302 of the conducting adhesive 310 or paste 311 located at spaced apart intervals or selected locations between the contact surfaces 117 and 150, adjacent to the adhesive layer 191. It will be appreciated that the dimensions including depth and radial extent of the adhesive layer 191 and the recess 159 may vary at different locations of the interface between the lens and lens holder, to allow for the location and alignment of the optical components and taking into account tolerances. The adhesive layer is preferably configured to extend circumferentially (360 degrees) between the contact surfaces.

Referring to FIGS. 2B and 2C, according to the exemplary arrangement a groove 155 is be provided between the contact surfaces 117 and 150. The groove 155 is configured to accommodate the conducting element 300 between the lens and lens holder. The groove 155 is formed in the contact surface 150. The groove 155 is defined by the outer radial portion 150-2' (lower contact surface portion) and of the contact surface 150 which is provided recessed from, or stepped down, relative to the inner radial portion 150-1 of the contact surface 150 (upper contact surface portion) at a riser 156. The groove 155 is arranged extending circumferentially around the contact surface 150 of lens support 140 at the outer radial portion 150-2' of the contact surface 150 located nearer to the outer peripheral edge 157.

The groove 155 when provided is configured to accommodate conducting element 300 that is locatable between the lens and lens holder to provide an electrically conducting connection therebetween. The groove 155 is formed mechanically. The groove 155 effectively provides additional space, in addition to that provided by recess 159, for accommodating the conductive element 300. By virtue of the arrangement of the features and the greater separation distance between the contact surfaces 117-2 and 150-2' at the recessed portions 150-2', 156 of the groove 155. The groove 155 together with the recess 159 define space to accommodate the conducting element 300 between the lower contact surface 117 of the lens mount and the lower recessed portion 150-2 of the upper contact surface 150 of the lens support. The additional volume available to accommodate the conducting element (in comparison with an arrangement that does not include a groove 155) is dependent on the depth Z(G) of the groove 155 as defined by the height of the riser 155 and the radial extent of the lower contact surfaces 150-2 (R2-R3).

The arrangement of the imaging system 1100 of FIG. 2 provides advantages including the following: in effect, the conductive element 300 defines an additional layer 301 comprised of the conductive adhesive 310 or the conductive paste 311 arranged about the lens chimney or body 311 between lens 310 and lens holder 330. The layer 301 is provided in addition to the adhesive layer 191. During assembly, the additional layer 301 of conductive adhesive 310 or conductive paste 311 is dispensed into the groove 155 between the lens 110 and lens holder 130 to couple the lens and the PCB. This conductive adhesive 310 or conductive paste 311 provides an electrically grounding connection between the lens 110 and lens holder 130 which is connected to the PCB.

The adhesive 190 has the required properties such that in use the adhesive layer 191 stabilizes the coupling between the lens and the lens holder for thermal cycling with micron level tolerance. Therefore, the coupling of the lens and lens holder at the adhesive layer 191 provides precision alignment of the components. The conducting element 300, in this exemplary arrangement comprised of a conducting paste or adhesive is configured to be resilient. The properties of the conducting element 300 are such that it does not affect the arrangement and alignment of the components as provided at the adhesive layer 191. The conducting element 300 is resilient and deformable for location in the recess 159 and/or recess 159 and groove 155 and resilient to engage with corresponding portions of the bearing surfaces 117 and 150 to provide an electrically conducting connection between the lens and lens holder.

The drawings illustrate a number of exemplary arrangements of the interface between the surfaces 117 and 150. With reference to FIGS. 2B and 2C, it was described that a mechanical groove 155 may be provided formed at the surface 150. It will be appreciated that in alternative arrangements, the form and location of the groove 155 may varied. The groove 155 may comprise one or more groove portions 155-1, 155-2, 155-$n$ formed circumferentially spaced apart around the receiver, instead of a groove portion 155 that is arranged to extend continuously around the annular contact surface of the lens support.

It will be appreciated that in alternative arrangements the groove may be formed at the surface 117 or at both surfaces 117 and 150. While in the arrangements of the drawings the adhesive layer 191 and the conducting layer 301 are illustrated to have exemplary forms and dimensions in the vertical and radial directions—it will be appreciated that the form and dimensions of both may vary for example depending on the form of the adhesive layer to provide optical alignment. In one example, the adhesive layer 191 may be arranged to extend across the surface areas (full radial extent) at portions of the interface of the lens and lens support, but to extend across a limited radial extent at other portions to form spaced apart recesses 159. In an alternative arrangement recess 159 may be formed by providing a tapered edge at one or more portions of one or both or the external peripheral edges 118 and 157 of the bearing surfaces 117 and 150 of the lens mount 114 and lens support 140.

Overall the arrangement of the imaging system 1100 and the conducting element 300 provide advantages including the following: Lens holder 130 (housing) is coupled to the lens 110 at the adhesive layer 191 during the active alignment process to couple the lens and lens holder as required optically. In addition to the adhesive layer 191 the conducting element 300 is provided. The conducting element 300 is defined by a second layer 301 of conductive adhesive 310/conductive paste 311 which is dispensed in the groove 155 between the lens 110 and lens holder 130. This conductive element 300 provides the grounding connection between the lens and lens holder which is later connected to the PCB. The arrangement of the lens system 1100 comprising the conducting element 300 advantageously addresses the issues relating to EMC arising with previous arrangements.

With reference to FIGS. 3 to 5, imaging systems 2100, 3100 and 4100 according to further exemplary arrangements of the present specification are described. Conducting elements 400, 500 and 600 respectively are provided, the conducting elements are configured to provide an electrical coupling the lens to the lens holder. The lens holder is configured for connection to the PCB to provide an electrical grounding of the lens to the PCB of the imaging systems. In the drawings, the form and features, of the imaging systems 2100, 3100, and 4100 are similar to those of imaging systems 100 and 1100 described above and the same reference numbers have been used in the drawings, where appropriate. Imaging systems 2100, 3100 and 4100 have many features in common with the features of the imaging system 100 including the lens 110, lens holder 130, imaging device 160 and PCB 180, and reference is made to the description above of these features which is relevant also to these arrangements.

Referring to FIGS. 3A to 3E, imaging system 2100 according to an exemplary arrangement of the specification is described.

Imaging system 2100 comprises a lens 110, lens holder 130, imaging device 160 and PCB 180. The lens 110 is attached to the lens holder 130 during an active alignment process. The lens and lens holder are attached an adhesive layer 191 arranged between contact surface 117 of lens mount 114 and contact surface 150 of lens support 140 of the lens holder. The adhesive layer 191 is arranged such that the lens 110 is optically oriented and aligned as required within the imaging system 2100. The adhesive 190 is non-conducting and provides a stable connection at the interface I between the lens and lens holder to maintain the optical arrangement. The interface I between the lens and lens support is the interface formed between the contact surfaces 117 and 150. The adhesive layer 191 of adhesive 190 is located extending between at least portions of the contact surfaces of each.

The imaging system 2100 further comprise a conducting element 400. The conducting element 400 of FIG. 3 defines a lens electrical grounding element configured for connection externally between the lens 110 and lens holder 130. Conducting element 400 is configured to provide an electrically conducting connection between the lens 110 and the lens holder 130. The lens holder 130 is coupled to the PCB 160 during assembly of the imaging device 2100 providing an electrically grounding connection between the lens 110 and PCB 180 via the lens holder 130.

Referring to FIGS. 3a to 3d, and initially in particular FIG. 3d, the conducting element 400 comprises a support 410. The support 410 has a generally annular or ring-shaped form and comprises a support wall 411. The support wall 411 is generally vertically oriented and has an upper edge surface 412, a lower surface 413, an internal peripheral wall 414 and external peripheral wall 415. The conducting element 400 comprises one or more contact arms 420 extending upwardly from the support 410 and circumferentially spaced apart around it.

In use, when the lens is located coupled to lens holder, and the conducting element 400 is located at the external peripheral wall 145 of the lens support 140, the conducting element 400 is arranged such that the one or more contact arms 420 extend generally upwardly relative to the lens holder to the lens. The contact arms may be configured to extend to the interface I or to extend to the outer peripheral surface 116 of the lens mount 114 beyond the interface, such that the interface I between the lens mount 114 and the lens support 140 is bridged.

The layer 191 of adhesive 190 provided between the surfaces 117, 150 may at least in part define one or more recesses 159 by providing a spacing or separation of said surfaces near the adhesive layer 191. The recess 159 may alternatively or at least partly be a mechanically formed recess, similarly to the recess 155, described with reference to FIG. 2 above.

Each contact arm 420 comprises a contact 422 arranged to engage with the lens and lens holder at the interface I. The contact 422 comprises a protrusion 424 configured in use to protrude into a portion of the recess 159 near the outer peripheral edge of the interface I. When the protrusion 424 is located in recess 159 the contact 422 is engaged with both the upper bearing surface 117 of the lens and the lower bearing surface 150 of the lens holder by virtue of the resilient properties and the biasing of the contact arm 420 which acts to clamp the contact 422 and protrusion at the recess 159. The conducting element 400 as described, provides an electrically conducting contact between the lens and lens holder, in addition to the non-conducting coupling at the adhesive layer.

While the support 410 of the arrangement shown has an O-shaped closed ring form, it will be appreciated that a conducting element of suitable alternative form may be provided. The support 410 may for example have a C-shaped/open or partial ring form. The support 410 may be resilient to allow for expansion for locating in place on the lens support 140 and biased to engage with it when located thereon. The contact arms 420 are biased to engage the contact 422 at the recess 159. The form and dimensions of the contact arms, the contact 422 and protrusion 424, are selected to provide for location of the contact 422 and 424 in the recess 159, in use. Overall, the effective electrical grounding of the lens to the PCB is provided in two-parts as follows—the lens is electrically connected to the lens holder which is electrically connected to the PCB. The conducting element 400 is a conducting spring element provided for electrically ground the lens to the PCB.

The problems discussed above with reference to existing arrangements including EMC are solved by the arrangement described including the conducting element 400 configured to ensure an electrically conducting contact between the lens and the lens holder.

The conducting element may be applied during assembly of the imaging device by placing over the lens and the lens mount.

To ensure the electrical contact between lens and lens holder the contact 422 may be located by virtue of the dimensions and form of the contact arms in the recess 159 provided located at the connection between the lens and the lens holder. As shown in the drawings a recess 159 may be provided at the periphery of the interface between the lens and lens holder between the contact surfaces 117 and 150 to receive a contact of the contact arm. The contact arm is resilient. By virtue of the configuration, the contact 422, 424 effectively is biased to engage the lens and lens holder at the recess, and/or to snap fit into the recess.

Referring to FIG. 3E in an exemplary arrangement, it is illustrated, similarly to the arrangement of FIG. 2, that the adhesive layer 191 may located substantially at first radially extending portion 150-1 of the contact surface and the recess 159 located at a second radially extending portion 150-2. In the arrangement of the drawings the adhesive layer 191 and the recess 159 are provided extending circumferentially about the interface. The arrangement of the drawings is for illustration purposes only and form and dimensions of the adhesive layer, and the form, dimensions, and location of the one or more recess 159 may be varied. For example, the radial extent of both the adhesive layer and resulting recess may be varied.

With reference to the assembly of the imaging system. The conducting element 400 may be applied to the lens holder lens chimney prior to the active alignment process and may inserted into place in the recess 159 after curing of the adhesive 190 of the adhesive layer 191. To ensure the electrical contact between lens and lens holder, the recess 159 may be created when the lens is coupled to the lens holder. In addition, or alternatively, a groove 155 may be provided formed mechanically on the components. Then electrical contact is provided by the lens holder contact with the PCB Referring to FIGS. 4a to 4d, an imaging system 3100 according to a further arrangement of the specification, is described.

Figure 4A:
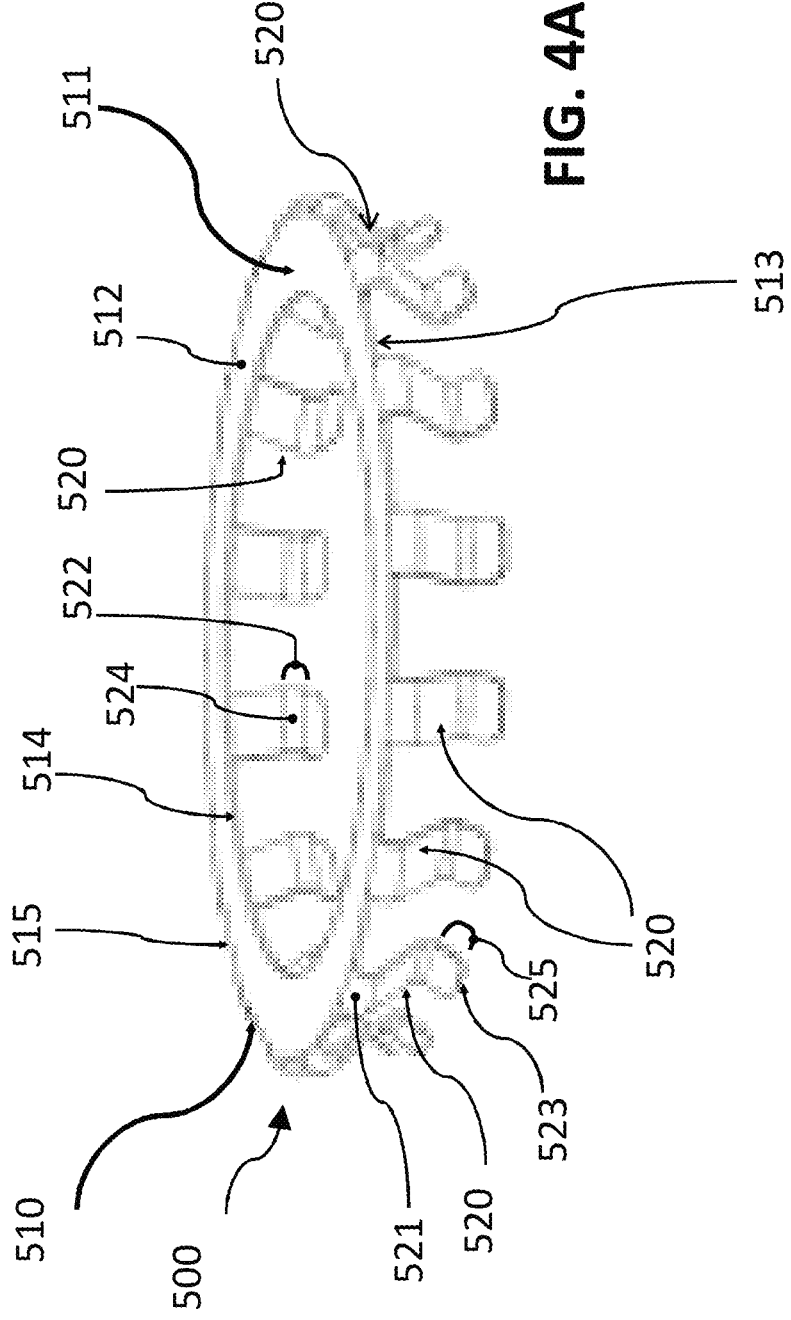
FIG. 4A to 4D show an alternative arrangement of an imaging system according to the specification.
Figure 4B:
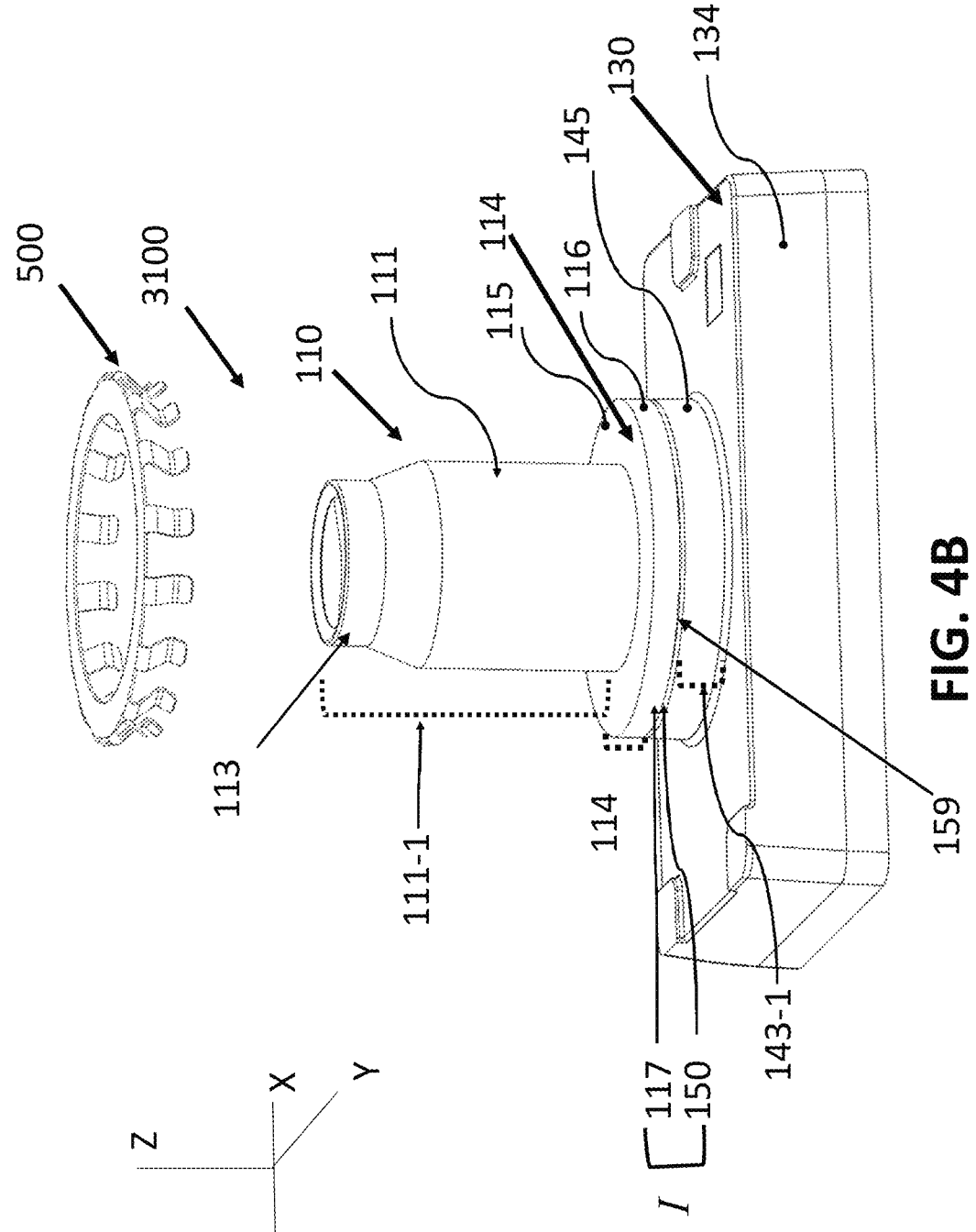
Figure 4C:
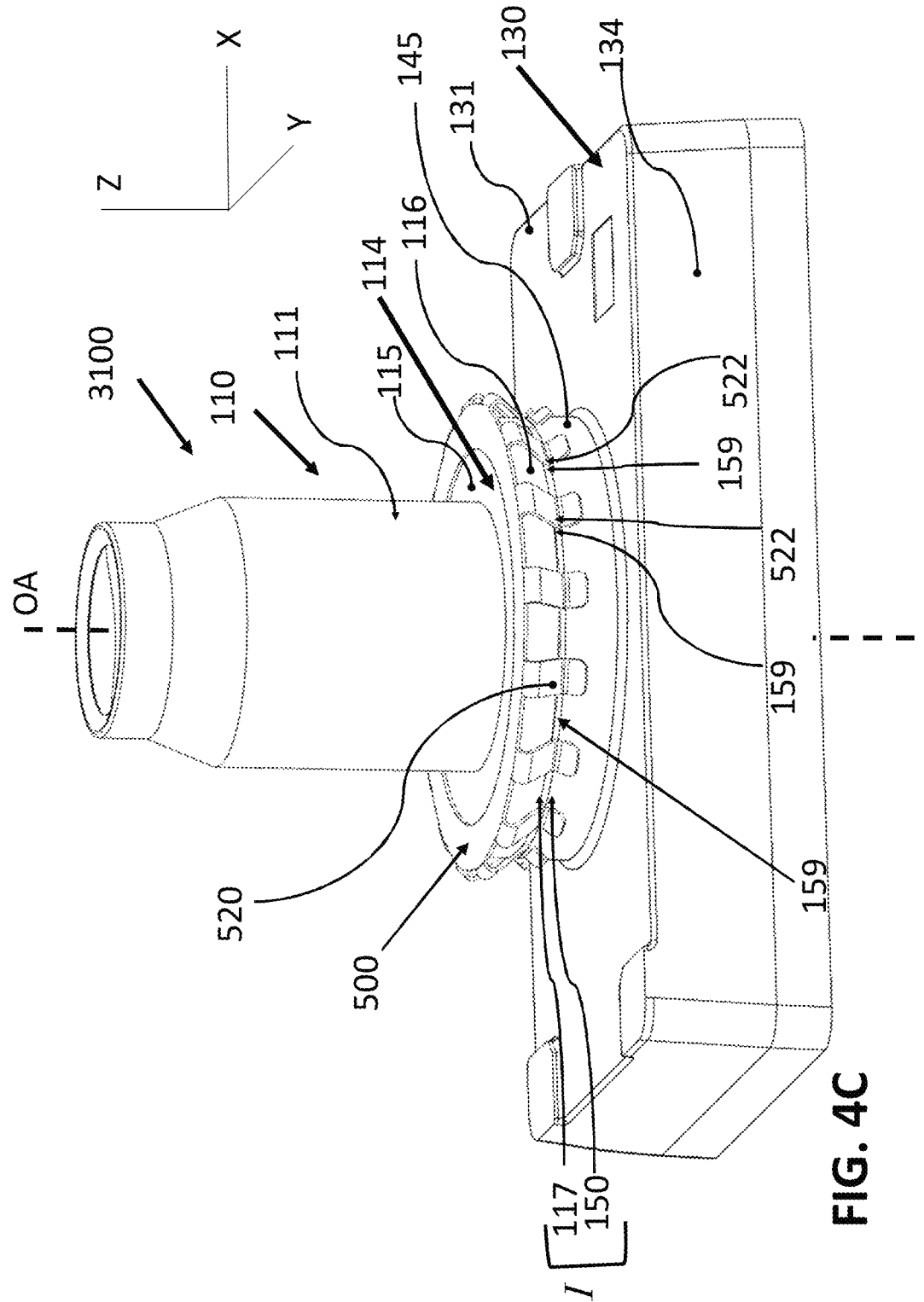
Figure 4D:
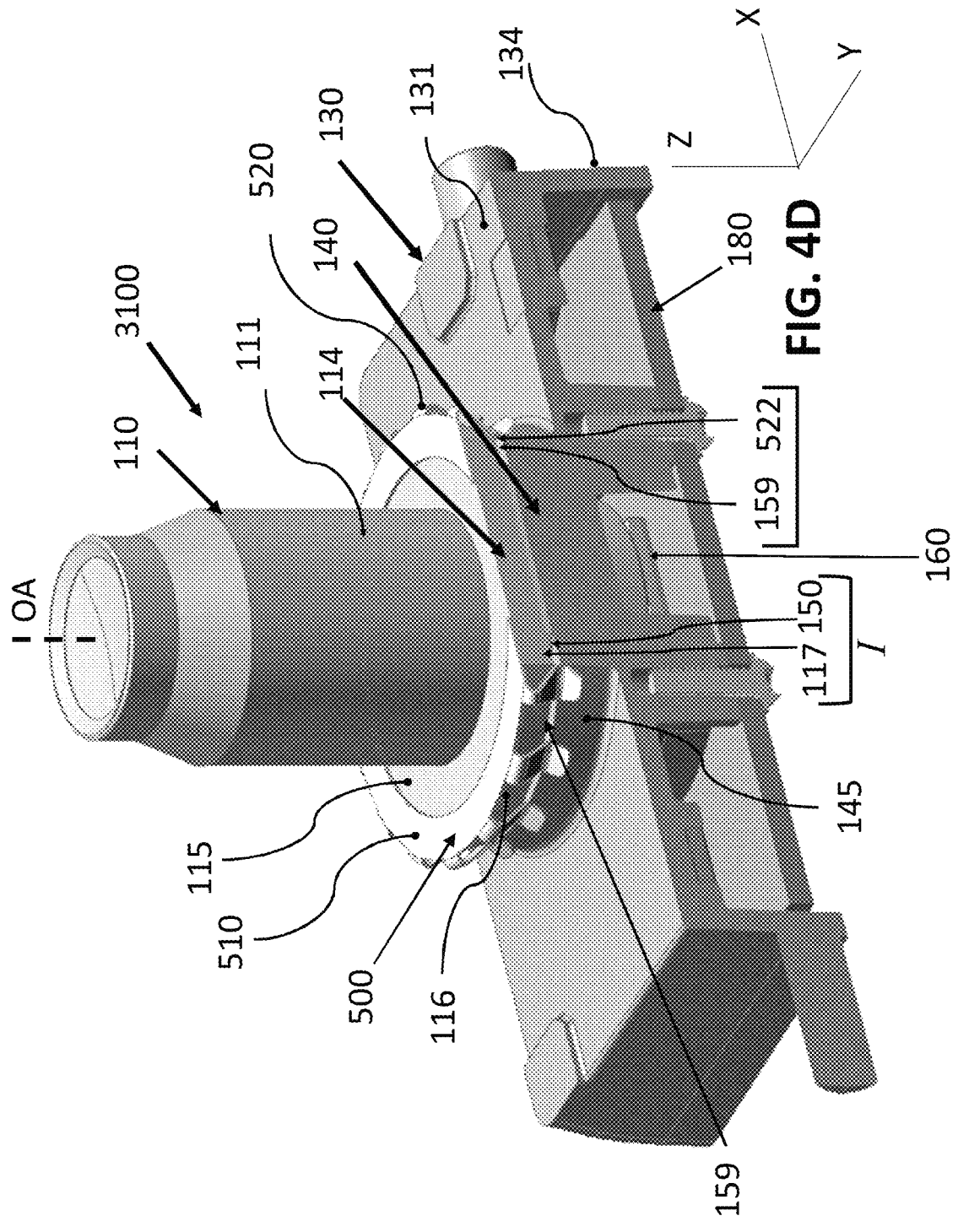

As shown in FIGS. 4B to 4D, imaging system 3100 comprises a lens 110, lens holder 130, imaging device 160 and PCB 180. The interface I between the lens and lens support is the interface formed between the contact surfaces 117 and 150 of the lens and lens holder 130 respectively. The lens 110 is attached to the lens holder 130 during an active alignment process. The lens and lens holder are attached an adhesive layer 191 arranged between contact surface 117 of lens mount 114 and contact surface 150 of lens support 140 of the lens holder. The adhesive layer 191 is arranged such that the lens 110 is optically oriented and aligned as required within the imaging system 3100. The adhesive 190 is non-conducting and provides a stable connection at the interface I between the lens and lens holder to maintain the optical arrangement. The adhesive 190 has the required physical properties to provide a stable coupling of the lens and lens holder. The adhesive 191 is non-conducting.

The imaging system 3100 further comprises a conducting element 500. The conducting element 500 of FIG. 4 defines a lens grounding element configured for connection externally between the lens 110 and lens holder 130. Conducting element 500 is configured to provide an electrically conducting contact between the lens 110 and the lens holder 130. The lens holder 130 is coupled to the PCB 160 during assembly of the imaging device 3100 providing an electrically grounding connection between the lens 110 and PCB 180 via the lens holder 130.

Referring to FIGS. 4a to 4d, and initially in particular FIG. 4A, the conducting element 500 comprises a support 510. The support 510 has a generally annular or ring-shaped form and comprises a support wall 511. The support wall 511 is generally oriented in a horizontal plane (X-Y directions) and has an upper wall surface 512, a lower wall surface 513, an internal peripheral edge 514 and external peripheral edge 515. The conducting element 500 comprises one or more contact arms 520 extending downwardly relative to the support 510 and circumferentially spaced apart around it.

In use, when the lens is located and attached to the lens support, and the conducting element 500 is located at the upper surface 115 and peripheral side wall 116 of the lens mount 114. The conducting element 500 is arranged such that the one or more contact arms 520 extend generally downwardly relative to the lens mount to the lens support. The contact arms 520 may be configured to extend to the interface I or to extend to the outer peripheral surface 145 of the lens support 140 beyond the interface, such that the interface I between the lens mount 114 and the lens support 140 is bridged.

The layer 191 of adhesive 190 provided between the surfaces 117, 150 may at least in part define one or more recesses 159 by providing a spacing of the surfaces near the adhesive layer 191, similarly to that described above with reference to FIGS. 3C and 3E. The recess 159 may alternatively or at least partly comprise one or more mechanically formed recesses, similarly to the recess 155 described with reference to FIG. 2 above.

Each contact arm 520 comprises a contact 522 arranged to engage with the lens and lens holder at the interface. The contact 522 comprises a protrusion 524 configured in use to protrude into a recess 159 near the outer peripheral edge of the interface I between the surfaces 117 and 150 of the lens mount 114 and the holder 150. When the protrusion 524 is located in a recess 159 the contact 522 and protrusion 524 are engaged with both the upper bearing surface 117 of the lens and the lower bearing surface 150 of the lens support by virtue of the resilient properties and the biasing of the contact arm 420. The conducting element 500 as described, provides an electrically conducting contact between the lens and lens holder, in addition to the non-conducting contact at the adhesive layer.

While the support 510 of the arrangement shown has an O-shaped closed ring form, it will be appreciated that a conducting element of suitable alternative form may be provided. The support 510 may for example have a C-shaped/open or partial ring form or. The support 510 may be resilient to allow for expansion for locating in place on the lens mount 114 and biased to engage with the lens and lens support 140 when located thereon. The contact arms 520 are biased to engage the contact 522 with the lens support and the lens at the recess 159. The form and dimensions of the contact arms and the form and location of the contact 522 or protrusion 524 are selected to provide for location of the contact 522/524 in the recess 159 when the support is located on the lens mount 114, in use. Overall, the effective electrical grounding of the lens to the PCB is provided in two-parts as follows—the lens is electrically connected to the lens holder which is electrically connected to the PCB. The conducting element 500 is a conducting spring element provided for electrically ground the lens to the PCB.

As shown in the drawings a recess 159 may be provided at the periphery of the interface between the lens and lens holder between the contact surfaces 117 and 150 to receive a contact of the contact arm. Each contact arm 520 is resilient. By virtue of the configuration, the contact 522, 524 effectively is biased to engage the lens and lens holder at the recess, and/or to snap fit into the recess. The contacts of the conducting element 500 are clamped to corresponding portions of the bearing surfaces of lens and lens holder.

The problems discussed above with reference to existing arrangements including EMC are solved by the arrangement described including the conducting element 500 configured to ensure an electrically conducting contact between the lens and the lens holder. The conducting element 500 may be applied during assembly of the imaging device by placing over the lens and the lens mount.

It will be appreciated that as described above with reference to FIG. 3E, the form and dimensions of the adhesive layer, and the form, dimensions, and location of the one or more recesses 159 may be varied.

With reference to the assembly of the imaging system 3100. The conducting element 500 may be applied to the lens mount prior to the active alignment process and may inserted into place in the recess 159 after curing of the adhesive 190 of the adhesive layer 191. To ensure the electrical contact between lens and lens holder, the recess 159 may be created when the lens is coupled with the lens holder. or alternatively may be formed mechanically.

The arrangement of the lens system 3100 provides for an electrical contact between the lens and lens holder. Further the electrical grounding of the lens is provided by the lens holder contact with the PCB.

The problems discussed above with reference to existing arrangements including EMC are solved by the arrangement described including the conducting element 500 configured to ensure an electrically conducting contact between the lens and the lens holder.

The conducting element 500 may be applied during assembly of the imaging device by placing over the lens and the lens mount. To ensure the electrical contact between lens and lens holder the contact 522, may be located by virtue of the dimensions and form of the contact arms, in the recess 159 provided located at the connection interface between the lens and the lens holder. As shown in the drawings recess 159 is located at the periphery of the interface between the lens and lens holder between the contact surfaces 117 and 150.

Referring to FIGS. 5A to 5E, an imaging system 4100 according to a further arrangement of the specification, is described. Imaging system 4100 comprises a lens 110, lens holder 130, imaging device 160 and PCB 180. The interface I between the lens and lens support is the interface formed between the contact surfaces 117 and 150 of the lens and lens holder 130 respectively. The lens is attached to the lens holder during an active alignment process. The lens and lens holder are attached at adhesive layer 191 arranged between contact surface 117 of lens mount 114 and contact surface 150 of lens support 140 of the lens holder. The adhesive layer 191 is arranged such that the lens 110 is optically oriented and aligned as required within the imaging system 4100. The adhesive 190 is non-conducting and provides a stable connection at the interface I between the lens and lens holder to maintain the optical arrangement. The adhesive 190 has the required physical properties to provide a stable coupling of the lens and lens holder.

The imaging system 4100 further comprises a conducting element 600. The conducting element 600 of FIG. 5 defines a lens electrical grounding element. Conducting element 600 is configured to provide an electrically conducting contact between the lens 110 and the lens holder 130. The lens holder 130 is further coupled to the PCB 160 during assembly of the imaging device 6100 providing an electrically grounding connection between the lens 110 and PCB 180 via the lens holder 130.

Figure 5A:
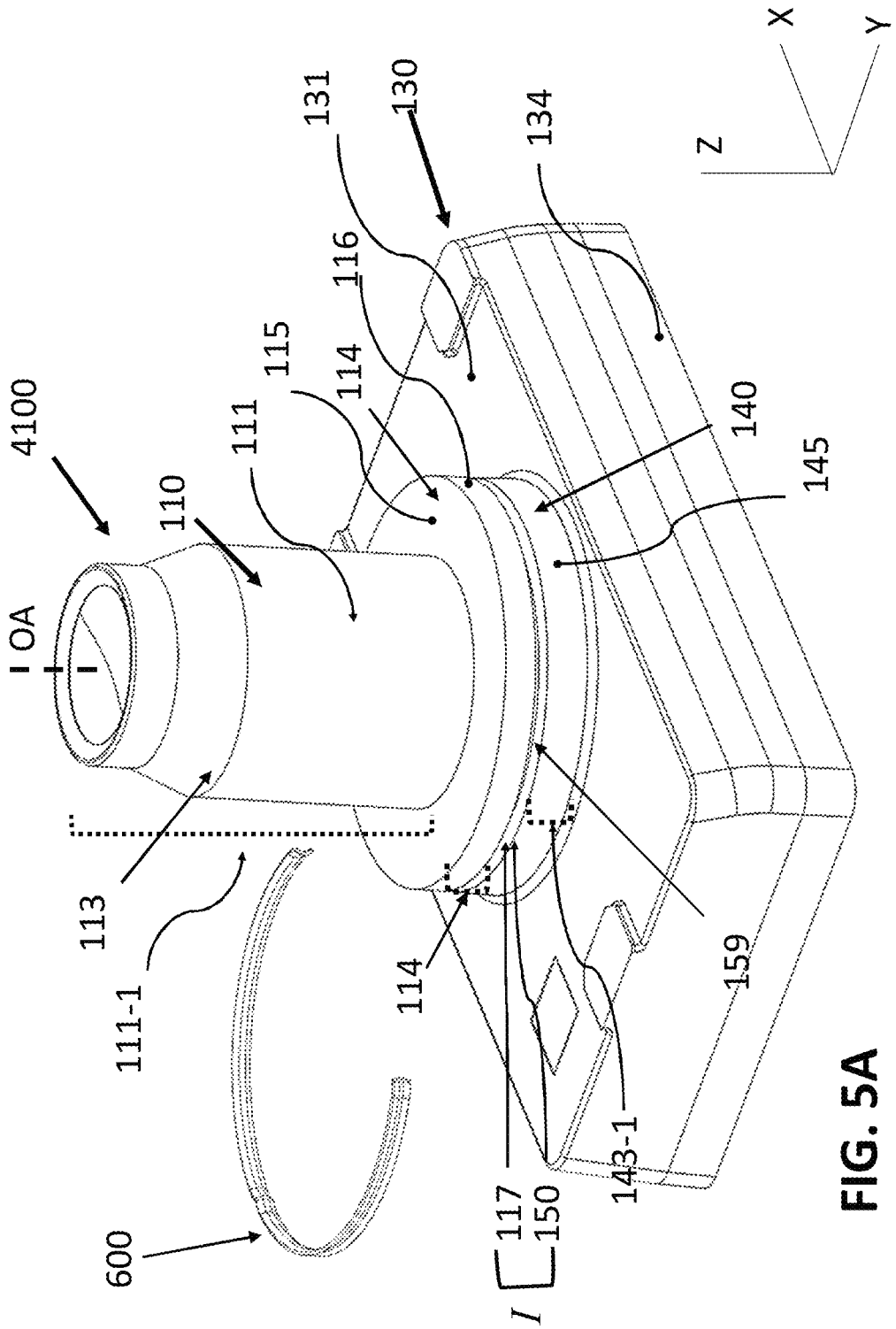
FIG. 5A to 5E show an alternative arrangement of an imaging system according to the specification.
Figure 5B:
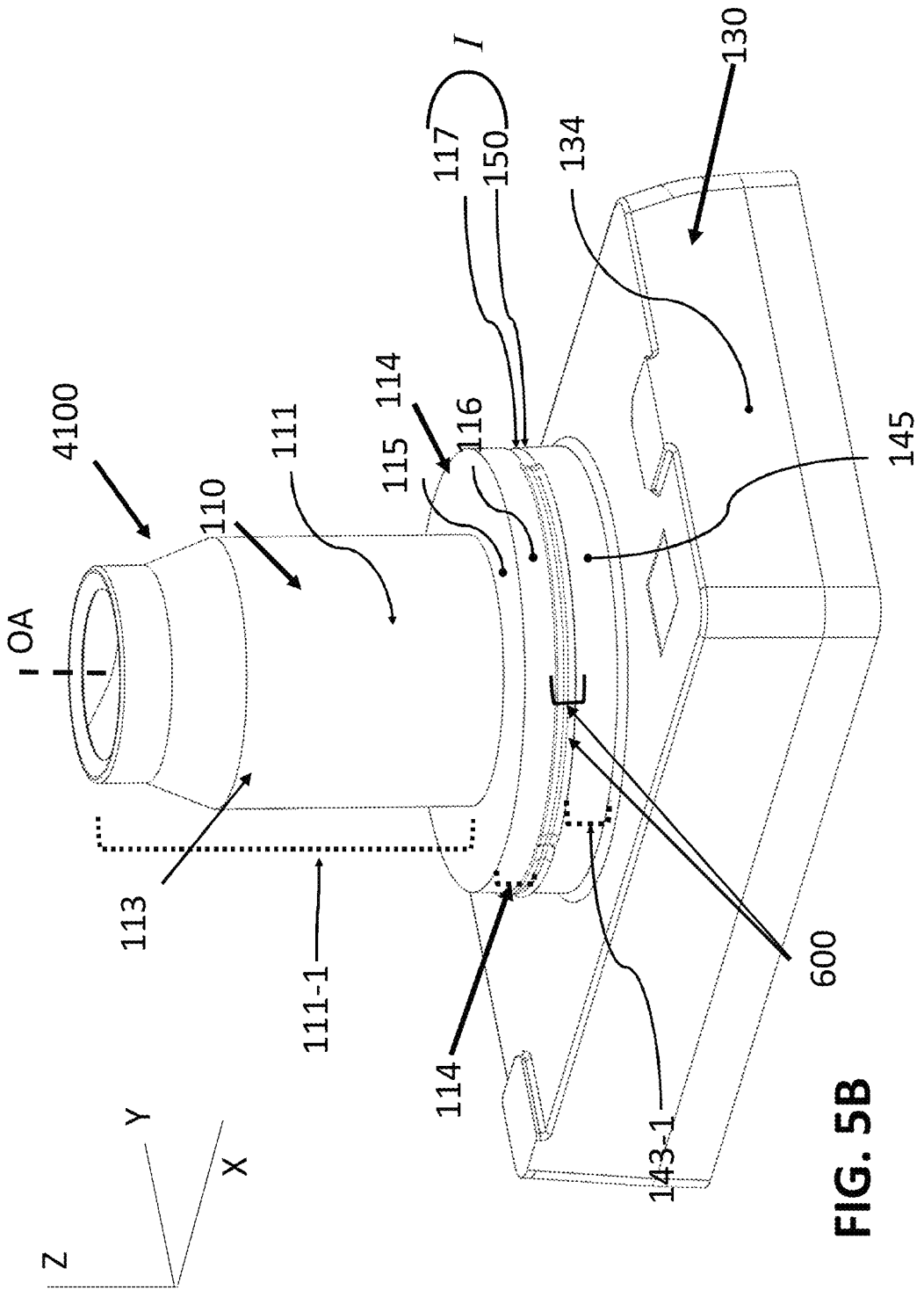
Figures 5C, 5D:
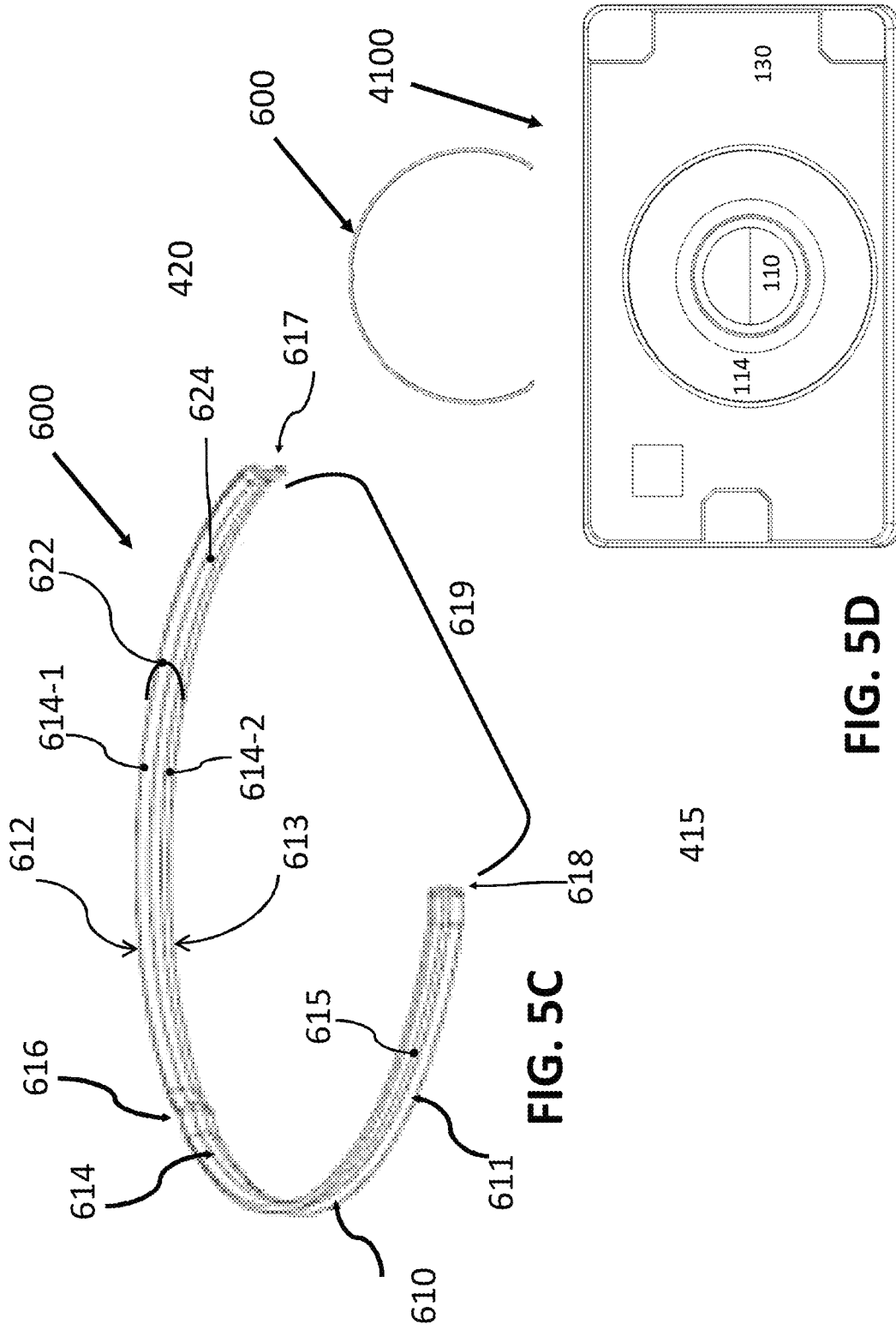

Referring to FIGS. 5A to 5E, and initially in particular FIG. 5D, the conducting element 600 is described. The conducting element 600 comprises a support 610. The support 610 comprises a support wall 611 having an upper edge surface 612, a lower edge surface 613, an internal peripheral wall surface 614 and external peripheral wall surface 615. The internal peripheral wall comprises a contact portion 622 or engagement surface 622. The contact portion 622 as shown in the exemplary arrangement of FIG. 5 comprises a protrusion 624. The protrusion 624 comprises a ridge arranged extending circumferentially around the interface peripheral wall. The ridge 624 is located, in the vertical direction Z, centrally on the wall, between a first upper wall portion 614-1 and a second lower wall portion 614-2.

It will be appreciated that the protrusion or ridge may have a different alternative form to that shown in the drawings. For example the conducting element may comprise one or more protrusion or ridges circumferentially spaced apart on the internal surface of the support.

The conducting element 600 has a C-shaped form, the support wall extending between a first end 617 and a second end 618 with an opening 619 therebetween. The support wall 611 is oriented in a generally vertical plane (Z direction) and is configured for attachment externally to the external peripheral surfaces 116 and 145 of the lens and lens holder at the interface I. The conducting element 600 is resilient and expandable to allow location at the interface I between the lens and lens holder, and biased to contract to engage the contact portion 622 and ridge 624 at the interface I.

As shown in FIG. 5C, the view of the end 617 of the exemplary arrangement shows the support 610 having a V-shaped form in cross-section, the upper wall portion 614-1 and lower wall portion 614-2 both inclined relative to the ridge 624. The conducting element is thus formed for engagement with the external portion of the interface I at the recess 159.

In use, when the lens is located on, and attached to the lens support, and the conducting element 600 is located at the interface I, the ridge 624 is located in the recess 159 and portions of the internal peripheral wall surface 614 are arranged bridging the interface and in contact with the lens mount 114 and the lens support 140.

When the protrusion 624 is located in the recess 159 the contact portion 622 and protrusion 624 are engaged with lens and lens holder by virtue of the resilient properties and the biasing of the conducting element. The conducting element 600 as described, provides an electrically conducting contact between the lens and lens holder, in addition to the non-conducting contact at the adhesive layer 191.

The layer 191 of adhesive 190 provided between the surfaces 117, 150 may at least in part define one or more recesses 159 by providing a spacing or separation of the surfaces 117 and 150 of the lens mount and the lens support adjacent to the adhesive layer 191, similarly to that described above with reference to FIGS. 3C and 3E. The recess 159 may alternatively or in addition at least partly comprise one or more mechanically formed recesses 155 similar to the recess 155 described with reference to FIG. 2 above.

The conducting element 600 may in one exemplary arrangement comprises a spring element which is applied after the assembly of the imaging by attaching the C-shape spring element from the side of the camera. To ensure the electrical contact between lens and lens holder the arrangement is located at the recess which was created the lens was connected to the lens holder or alternative or additionally formed on the mechanical parts. Further an electrical contact is provided by the lens holder being contacted to the PCB.

Figure 5E:
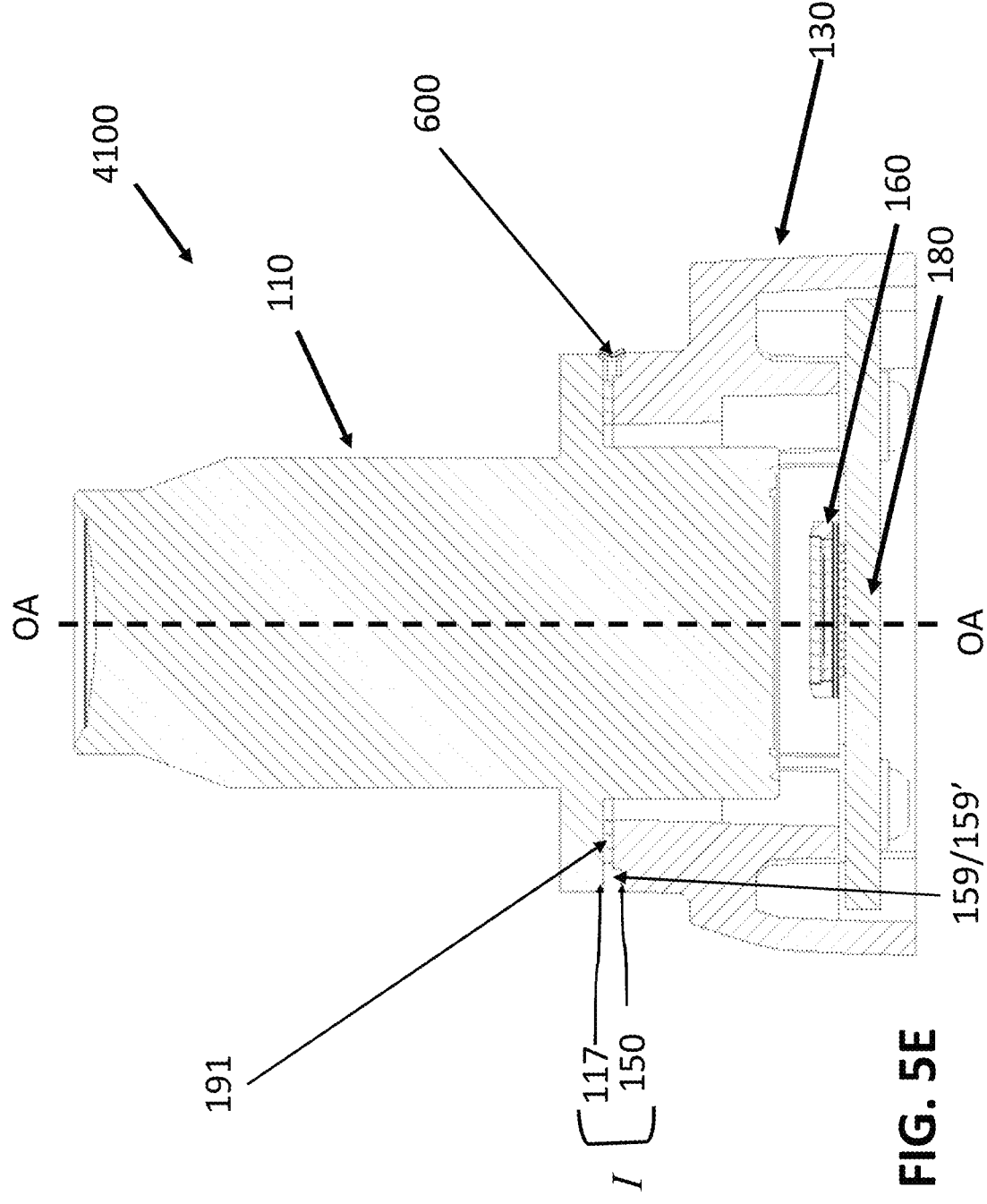

Shown in FIG. 5E is a cross-section of the imaging system of FIG. 5A. The imaging system 4100 comprises a lens 110, lens holder 130, imaging device 160 and PCB 180. It can be seen in cross-section that the conducting element 600 is seated in the recess 159 at the interface of the lens and the lens mount.

Taking account of the arrangement of the lens and lens holder, the adhesive layer 191 formed using the epoxy adhesive for lens attachment is an insulating layer. The lens 110 is comprised of a metal such as brass or aluminium, and as such noise collected by the lens from the environment may be transmitted to the imaging device and the imaging device components during use. The provision of the imaging system according to the specification and comprising the conducting element mitigates the risk of transmission of noise to the PCB. The imaging system according addresses the risk of camera malfunction due to the effects of noise on the imaging device components and provides an improved and alternative imaging system arrangement.

The arrangement of the claims provided a stack optical system in which the lens is provided located on a lens support relative to the imaging device. The arrangement of the claims provides for an electrical grounding connection between the lens and the PCB. The electrical grounding connection is provided and configured such that the optical alignment of the components is not affected by the electrically conducting element. The electrically conducting element may be located to contact the lens at an external surface. The electrically conducting element may be configured for located at or proximal to the interface between the components.

The solution brings advantages in comparison with previous approaches, including the following:

Reduces the need for many loops and iterations in the design of PCBs

Provides a improved and robust arrangement.

Improvements in relation to EMC issues

The arrangement of the specification can be tailored for application in different specific set-ups.

Unless context dictates otherwise, use herein of the word "or" may be considered use of an "inclusive or," or a term that permits inclusion or application of one or more items that are linked by the word "or" (e.g., a phrase "A or B" may be interpreted as permitting just "A," as permitting just "B," or as permitting both "A" and "B"). Also, as used herein, a phrase referring to "at least one of" a list of items refers to any combination of those items, including single members. For instance, "at least one of a, b, or c" can cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c, or any other ordering of a, b, and c). Further, items represented in the accompanying figures and terms discussed herein may be indicative of one or more items or terms, and thus reference may be made interchangeably to single or plural forms of the items and terms in this written description.

What is claimed is:

1. An imaging system comprising:
an imaging device mounted on a printed circuit board (PCB) of the imaging system;
a lens;
a lens holder; and
an electrically conducting element configured to provide an electrical grounding connection between the lens and the PCB;
wherein:
the lens is attached to the lens holder at an interface between a first upper bearing surface of the lens and a second lower bearing surface of the lens holder;
the lens is attachable to the lens holder at an adhesive layer located between the bearing surfaces at a first interface portion;
the adhesive layer is non-conducting and configured to provide a stabilized coupling between lens and the lens holder for precision alignment of optically active components;
at least one recess is provided at a second interface portion between the first bearing surface and the second bearing surface; wherein the conducting element is configured for engagement with the bearing surfaces of each of the lens and the lens holder at least one corresponding recess to provide an electrically conducting connection between the lens and lens holder; and the conducting element is resilient and of annular or c-shaped form, deformable for location in the recess.

2. The imaging system of claim 1, wherein:
the first interface portion and the second interface portions are arranged radially side by side, and
the adhesive layer is located at first interface portion, and the recess is located at the second interface portion.

3. The imaging system of claim 1, wherein the at least one recess is at least partially defined by the adhesive layer, and portions of the first and second bearing surfaces of the lens and lens holder adjacent to the adhesive layer, said bearing surfaces being spaced apart in a vertical direction by the adhesive layer located therebetween.

4. The imaging system of claim 1, wherein the at least one recess is at least partially defined by a groove mechanically formed in one or both of the bearing surfaces of the lens and lens holder.

5. The imaging system of claim 1, wherein the conducting element comprises a conducting adhesive or paste configured to be located in a conducting layer in the recess such that engagement surfaces of the conducting layer are in contact with corresponding portions of bearing surfaces of each of the lens and the lens holder at the recess to provide an electrically conducting connection between the lens and the lens holder.

6. The imaging system of claim 1, wherein the conducting element comprises:
a support configured in use for engagement with a corresponding bearing surface of the lens or the lens holder; and
one or more contact arms circumferentially spaced apart on the support and extending therefrom,
wherein each contact arm comprises an engagement surface, and
wherein each contact arm is resilient and biased in a direction inwardly relative to the support, such that in use when the support is located on externally on the lens or the lens holder, the engagement surface configured for engagement in a corresponding recess such that the conducting element is in contact with a corresponding bearing surface of each of the lens and the lens holder to provide an electrically conducting connection between the lens and the lens holder.

7. The imaging system of claim 6,
wherein in use, the support of the conducting element is receivable at an external portion of the lens holder, and
wherein the one or more contact arms extend upwardly from the support in the direction of the lens.

8. The imaging system of claim 6,
wherein in use, the support of the conducting element is receivable at an external portion of the lens, and
wherein the one or more contact arms extend downwardly from the support in the direction of the lens holder.

9. The imaging system of claim 6, wherein the conducting element comprises:
a support comprising a support wall having a first internal peripheral wall and a second external peripheral wall surface and extending between a first end and a second end with an opening therebetween, in a C-shaped form, the support configured to expand for locating externally on the lens and the lens holder near the interface,
wherein the internal peripheral wall comprises an engagement surface for engagement with corresponding portions of both the lens and the lens holder to provide an electrically conducting connection between the lens and the lens holder.

10. The imaging system of claim 9, wherein the engagement surface is arranged according to at least one of the following:

(i) wherein the engagement surface comprises one or more protrusions formed protruding inwardly relative to the engagement surface in the direction of the lens and lens holder, each protrusion being receivable in the recess;

(ii) wherein the engagement surface comprises one or more protrusions comprising a ridge arranged extending circumferentially around the internal peripheral wall, each protrusion being receivable in the recess;

(iii) wherein the engagement surface comprises a protrusion receivable in the recess at the interface; or (iv) wherein the engagement surface is comprised of a metal and is electrically conducting.

11. The imaging system of claim 6, wherein the support is resilient and is deformable for locating on a body of the lens and/or the lens holder and is biased to engage with the body of the lens and/or the lens holder.

* * * * *